US009338486B2

(12) United States Patent
Phillips

(10) Patent No.: US 9,338,486 B2
(45) Date of Patent: May 10, 2016

(54) OPTIMIZING ABR SEGMENT SIZES FOR MOBILE VIDEO OUTAGE COVERAGE IN AN ABR STREAMING NETWORK

(71) Applicant: Ericsson Television Inc., Duluth, GA (US)

(72) Inventor: Chris Phillips, Hartwell, GA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 14/474,535

(22) Filed: Sep. 2, 2014

(65) Prior Publication Data

US 2016/0065995 A1 Mar. 3, 2016

(51) Int. Cl.

| H04N 21/238 | (2011.01) |
|---|---|
| H04N 21/24 | (2011.01) |
| H04N 21/258 | (2011.01) |
| H04N 21/414 | (2011.01) |
| H04N 21/433 | (2011.01) |
| H04N 21/45 | (2011.01) |
| H04N 21/845 | (2011.01) |
| H04L 29/06 | (2006.01) |
| H04W 4/02 | (2009.01) |

(52) U.S. Cl.
CPC ............ *H04N 21/238* (2013.01); *H04L 65/607* (2013.01); *H04N 21/2401* (2013.01); *H04N 21/25841* (2013.01); *H04N 21/41407* (2013.01); *H04N 21/4331* (2013.01); *H04N 21/4524* (2013.01); *H04N 21/8456* (2013.01); *H04W 4/028* (2013.01)

(58) Field of Classification Search
CPC ......... H04L 29/06; H04W 4/028; H04W 4/02
See application file for complete search history.

(56) References Cited

U.S. PATENT DOCUMENTS

| 2010/0121977 | A1* | 5/2010 | Kontola et al. ............... 709/232 |
|---|---|---|---|
| 2012/0009890 | A1* | 1/2012 | Curcio et al. ................ 455/230 |
| 2012/0257671 | A1* | 10/2012 | Brockmann et al. ..... 375/240.02 |
| 2013/0163430 | A1* | 6/2013 | Gell et al. .................... 370/235 |
| 2014/0089469 | A1* | 3/2014 | Ramamurthy et al. ....... 709/219 |

FOREIGN PATENT DOCUMENTS

| CN | 101969372 A | 2/2011 |
|---|---|---|
| EP | 2073486 A1 | 6/2009 |

OTHER PUBLICATIONS

Singh, et al.: "Predictive Buffering for Streaming Video in 3G Networks". 2012 IEEE International Symposium. Jun. 25, 2012.
Abou-Zeid, et al.: "Energy-Efficient Adaptive Video Transmission: Exploiting Rate Predictions in Wireless Networks". IEEE Transactions on Vehicular Technology. vol. 63, No. 5. Jun. 2014.

* cited by examiner

*Primary Examiner* — Randy Flynn

(57) ABSTRACT

A scheme for optimizing segment sizes for an adaptive bitrate (ABR) streaming client engaged in a current ABR streaming session. In one implementation, a determination is made whether a wireless UE device executing the ABR streaming client is approaching a radio white spot area. If so, a video buffer of the ABR client is configured to preload a fixed number of segments having an adjusted size depending on the duration of the radio white spot area. The preloaded segments may comprise lower quality video segments, and as the wireless UE device exits the radio white spot area, the segment size and/or bitrates may be restored depending on the signal quality.

17 Claims, 16 Drawing Sheets

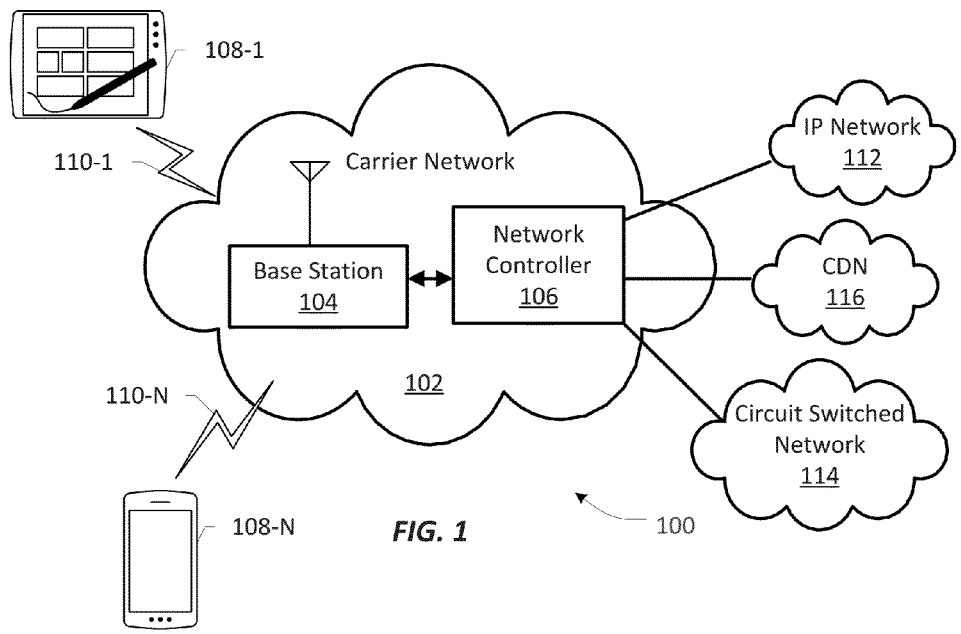
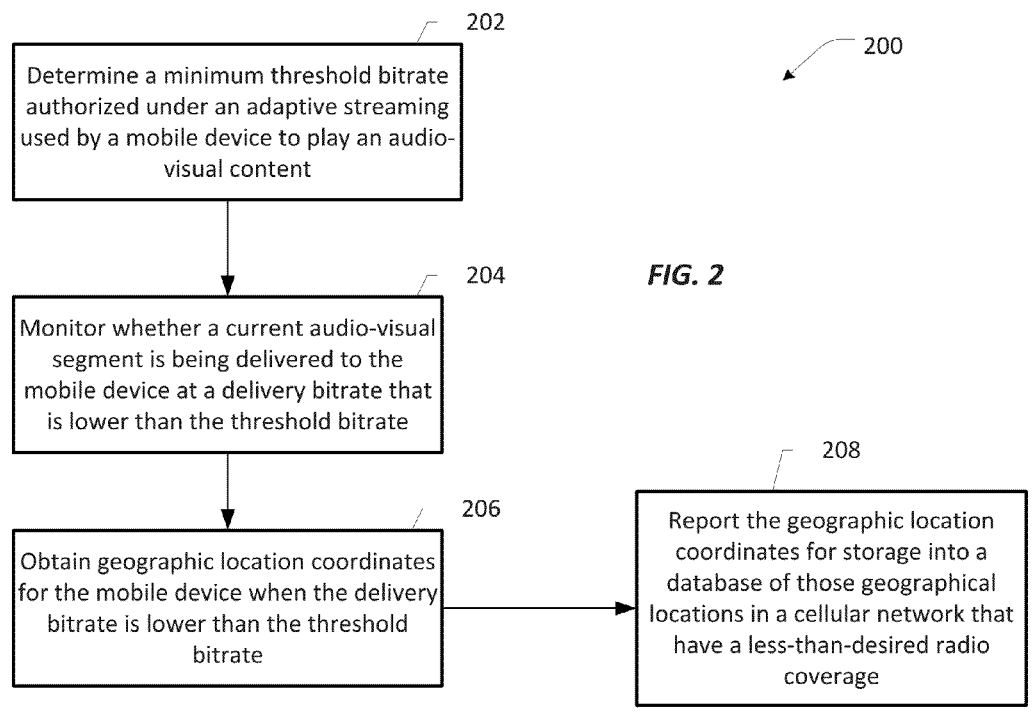

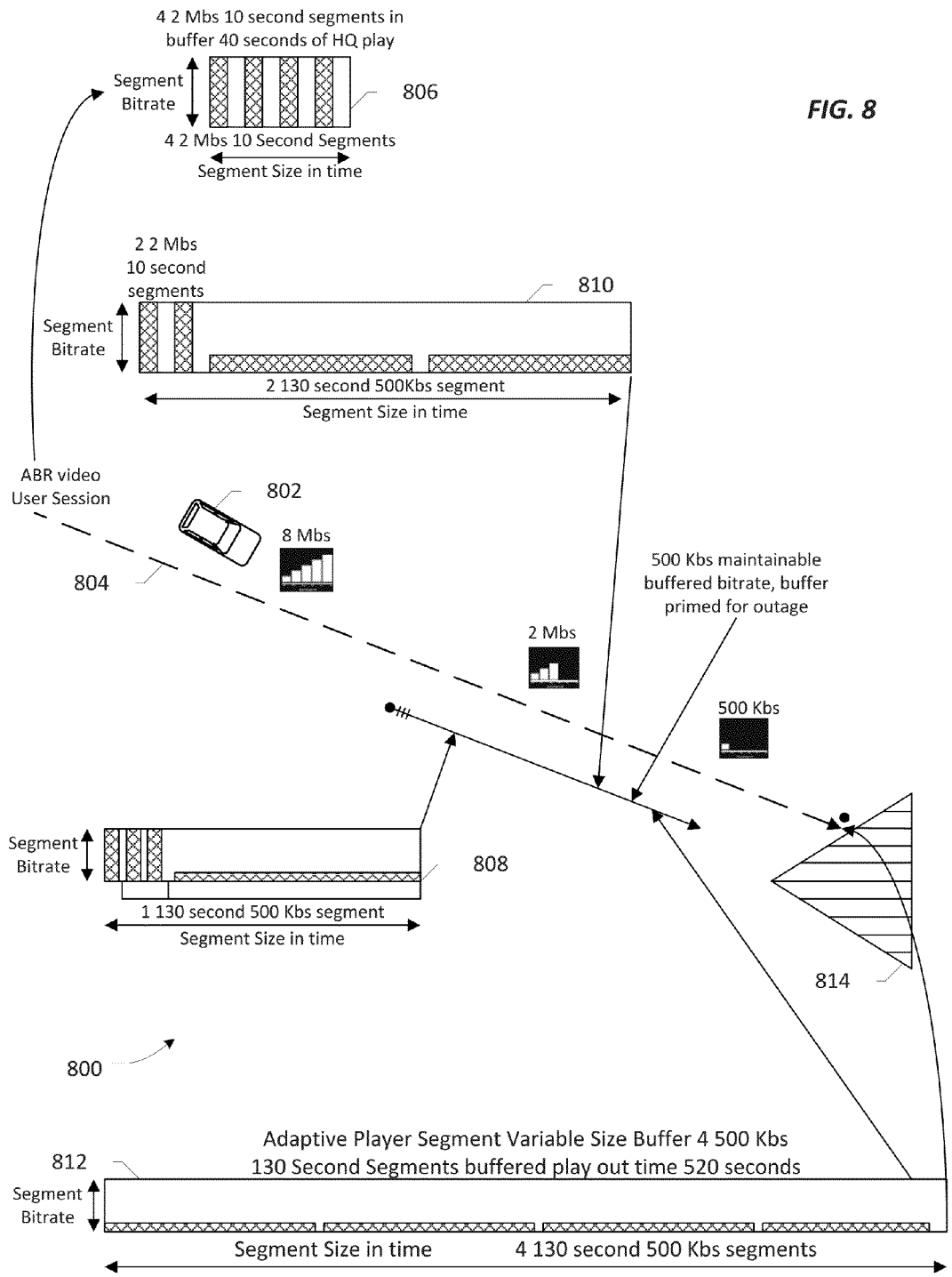

OPTIMIZING ABR SEGMENT SIZES FOR MOBILE VIDEO OUTAGE COVERAGE IN AN ABR STREAMING NETWORK

FIELD OF THE DISCLOSURE

The present disclosure generally relates to communication networks. More particularly, and not by way of any limitation, the present disclosure is directed to a system and method for optimizing segment sizes in an adaptive bitrate (ABR) streaming environment that may include outage areas.

BACKGROUND

While mobile radio data network coverage is widespread, there may be areas where data coverage is low or where there is not enough channel signal-to-noise due to various factors such as, e.g., structures, interference, weather, etc. Although phone calls can generally overcome these issues by switching to a different network protocol, video delivered over data networks generally cannot. Accordingly, when consuming video via ABR streaming while traveling through an area of low coverage or poor signal quality, it becomes necessary to manage a user's experience in a satisfactory manner.

SUMMARY

The present patent disclosure is broadly directed to systems, methods, apparatuses, devices, and associated non-transitory computer-readable media for managing ABR streaming sessions in a wireless network environment that may have potential video outage areas (also referred to herein as "white spots"). In one aspect, an embodiment of a method for modulating an ABR streaming client engaged in a current ABR streaming session is disclosed. The claimed method involves, inter alia, determining that a wireless UE device executing the ABR streaming client is approaching or will be in a radio white spot area (i.e., video outage area), wherein the ABR streaming client is configured with a buffer having a fixed number of media segments for the current streaming session. Responsive to the determination, the segment sizes are dynamically adjusted based on how long a service outage is estimated to be while the wireless UE device is traversing the white spot area.

In another aspect, an embodiment of a wireless UE device comprises an ABR buffer for storing a fixed number of media segments encoded at different bitrates pursuant to an ABR streaming session and an ABR client player configured to play back content out of the ABR buffer. The claimed wireless UE device further comprises one or more processors coupled to a persistent memory having program instructions for controlling the ABR client player to receive a fixed number of segments having segment sizes adjusted responsive to a determination of how long a service outage is estimated to be while the wireless UE device is traversing the white spot area.

In a still further aspect, an embodiment of an ABR stream delivery server configured to modulate an ABR streaming client is disclosed. The claimed ABR stream delivery server may be implemented as part of a radio network controller disposed in a wireless radio network environment and may include, inter alia, an interface to a video outage and Quality of Service (QoS) datastore having geographic location data pertaining to areas where radio coverage is suboptimal for streaming content to a wireless UE device executing the ABR streaming client; and an interface to a segmenter configured to receive an ABR content stream and provide a virtual representation of the segmented ABR content stream encoded at different bitrates. The ABR stream delivery server further includes one or more processors coupled to a persistent memory having program instructions configured to: determine that the wireless UE device is approaching a radio white spot area; determine that the ABR streaming client's buffer is configured to store a fixed number of media segments for the ABR streaming session; and dynamically adjust segment sizes of a plurality of media segments to be downloaded to the ABR streaming client responsive to a determination of how long a service outage is estimated to be while the wireless UE device is traversing the radio white spot area.

In still further aspects, one or more embodiments of a non-transitory computer-readable medium containing computer-executable program instructions or code portions stored thereon are disclosed for performing one or more embodiments of the methods set forth above when executed by a processor entity of a network node, element, UE device, and the like, mutatis mutandis. Further features of the various embodiments are as claimed in the dependent claims.

Advantages of the present invention include, but not limited to, the ability to adapt to potential outage areas that may be encountered in an ABR streaming environment. As will be seen hereinbelow, a video outage learning process accompanying one or more implementations is operative to provide a video QoS-aware location database with respect to the potential outage areas. Where the ABR client's buffer is known to store a fixed number of segments, the segment size may be dynamically optimized such that enough content having a total playout time that lasts while traversing an outage area can be advantageously pre-loaded into the buffer. Accordingly, by detecting potential video outage areas in a wireless network and appropriately adjusting the segment sizes in a preemptive fashion, better user experience may be achieved in the ABR streaming environment. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 1 depicts an example wireless network environment for facilitating ABR streaming with optimized segment sizing according to one or more embodiments of the present patent application;

FIG. 2 depicts a flowchart of an example methodology for building a database of video outage areas (i.e., radio white spot areas) according to an embodiment for purposes of the present patent application;

FIG. 8 depicts an example environment illustrating segment size adjustment and associated buffer status as an ABR client device approaches a potential video outage area;

DETAILED DESCRIPTION OF THE DRAWINGS

Figure 3:
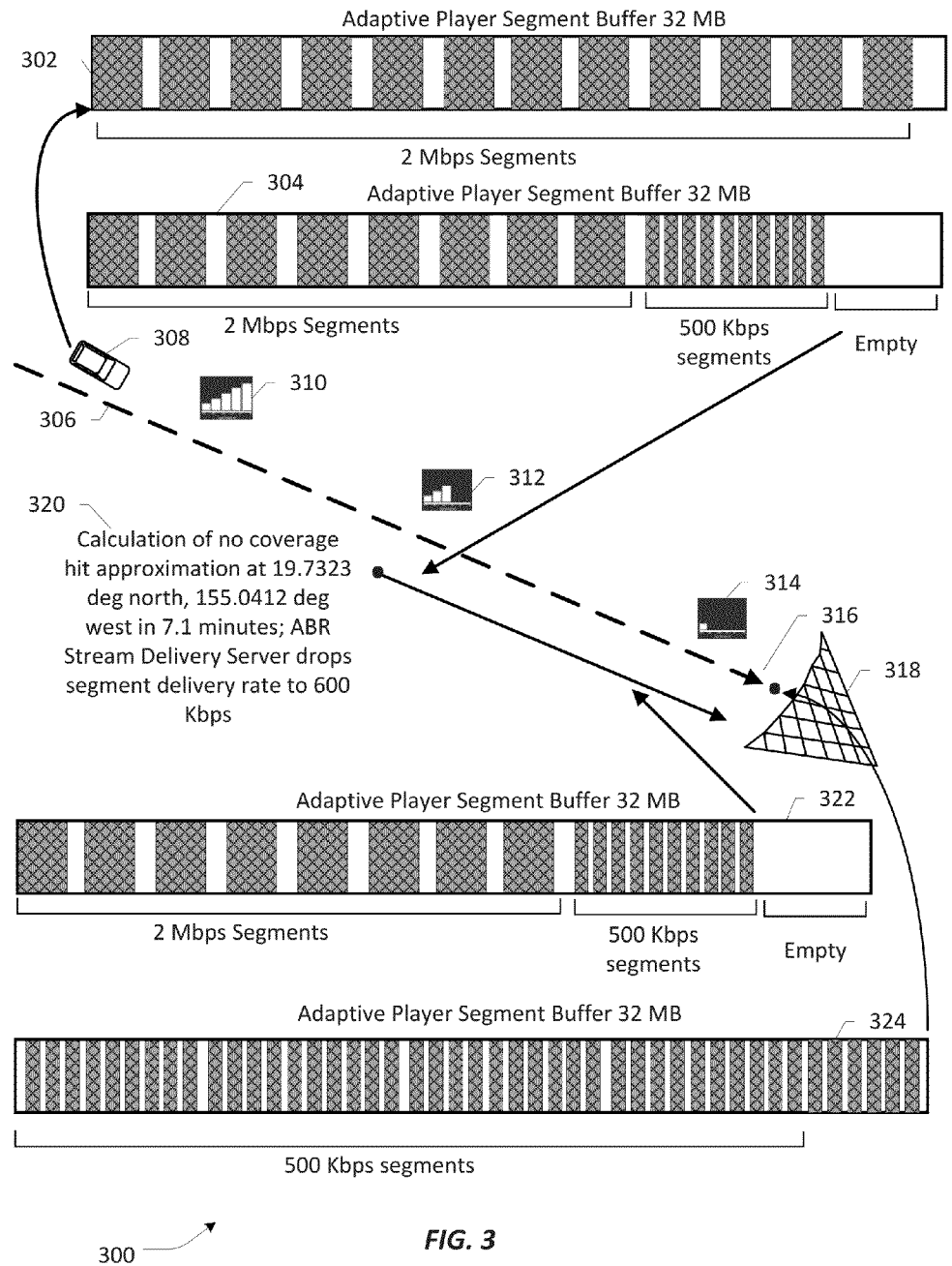
FIG. 3 depicts an example environment that illustrates bandwidth/bitrate throttling in a scenario where a potential video outage area may be encountered.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., NV media management, session control, Quality of Service (QoS) policy enforcement, bandwidth scheduling management, subscriber/device policy and profile management, content provider priority policy management, streaming policy management, advertisement push policy management, and the like), in addition to providing support for multiple application services (e.g., data and multimedia applications). Subscriber end stations or client devices may comprise any device configured to execute, inter alia, a streaming client application (e.g., an ABR streaming client application) for receiving content from one or more content providers, e.g., via mobile telephony networks. Such client devices may therefore include portable laptops, netbooks, palm tops, tablets, mobile phones, smartphones, multimedia phones, Voice Over Internet Protocol (VOIP) phones, mobile/wireless user equipment, portable media players, portable gaming systems or consoles (such as the Wii®, Play Station 3®, etc.) and the like that may access or consume content/services provided over a content delivery network via a suitable high speed wireless connection for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example wireless network environment 100 for facilitating ABR streaming with optimized and/or otherwise modulated segment sizing according to one or more embodiments of the present patent application. A plurality of exemplary wireless or mobile devices or user equipment (UE) devices 108-1 to 108-N are shown as being operational in the wireless environment 100 including an exemplary mobile communication network or carrier network 102. In the discussion herein, the terms "wireless network," "mobile communication network," "carrier network", or terms of similar import may be used interchangeably to refer to a wireless communication network (e.g., a cellular network, a proprietary data communication network, a corporate-wide wireless network, etc.) that facilitates voice and/or data communications with different types of wireless mobile devices (e.g., devices 108-1 to 108-N). In one embodiment, such devices may be a User Equipment (UE) or a Mobile Station (MS) (also referred to by various analogous terms such as "mobile handset," "wireless handset," "mobile device," "mobile terminal," etc.) capable of receiving adaptively streamed/delivered audio-visual content from the network 102 and playing it using a local ABR client player executing thereon. In some other embodiments, wireless mobile devices may comprise portable gaming devices, electronic tablets, laptops equipped with suitable wireless modems, e-readers, and the like, as alluded to previously. To the extent a wireless UE device may include an ABR client player for effectuating video streaming, it may also be referred to as an ABR client device or mobile client device, or simply a client, depending on the context for purposes of the present patent application.

UE devices 108-1 to 108-N are shown to be in wireless communication (via respective radio links 110-1 to 110-N) with the wireless network 102 through one or more base stations, e.g., base station (BS) 104 (also interchangeably referred to herein as a "mobile communication network node" or simply a "node") of the network 102. The example base station 104 may provide radio interface (in the form of suitable Radio Frequency (RF) links depending on the particular mobile communications technology) to devices 108-1 to 108-N via appropriate antenna elements. By way of example, the base station 104 may comprise a base station in a Third Generation (3G) network, or an evolved Node-B (eNodeB or eNB) when the carrier network is a Third Generation Partnership Project's (3GPP) Long Term Evolution (LTE) network. In some example embodiments, the base station 104 may also include a site controller, an access point (AP), a radio tower, or any other type of radio interface device capable of operating in a wireless environment. In addition to providing air interface or wireless channel (e.g., as represented by wireless links 110-1 to 110-N) to the wireless UE devices, the communication node (or base station) 104 may also perform radio resource management (as, for example, in case of an eNodeB in an LTE system). In case of a 3G carrier network, example base station 104 may include functionalities of a 3G base station along with some or all functionalities of a 3G Radio Network Controller (RNC). Additionally, base station 104 may be part of an Access Network (AN) (not shown) portion of the carrier network 102, wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like.

Example carrier network 102 may include a network controller 106 coupled to the base station 104 for providing logical and control functions relative to, e.g., roaming support and/or terminal mobility management, subscriber account management, billing, etc., as well as accessing of external networks or communication entities and delivery of streamed NV content from one or more content sources. By way of example, connectivity to other networks or infrastructures such as, for instance, the Internet 112, CDN 116 and a circuit-switched landline telephone network (i.e., a Public-Switched Telephone Network or PSTN) 114, is illustrated. In case of an LTE carrier network, network controller 106 may include some or all functionalities of an Access Gateway (AGW) or an Evolved Packet Core (EPC) node. In certain embodiments, such functionalities may comprise, for example, an IMT core network functionality or an ETSI TISPAN (European Telecommunications Standards Institute TIPHON (Telecommunications and Internet Protocol Harmonization over Networks) and SPAN (Services and Protocols for Advanced Networks)) core network functionality. Regardless of a particular implementation of the carrier network, base station 104 and/or network controller functionality 106 may be configured to facilitate, in conjunction with or independent of one or more external network entities and databases, methodologies for controlling delivery of ABR streaming sessions as well as modulating ABR segment sizes in potential video outage areas that may be encountered in the wireless network environment 100, as will be set forth in detail hereinbelow.

For purposes of the present patent application, the wireless UE devices 108-1 to 108-N may be configured to receive or otherwise consume various types of content via streaming sessions effectuated over a suitable wireless connection, which streaming sessions may at least partly involve delivery or distribution of convent via a delivery network such as CDN 116 coupled to the wireless network serving the wireless UE device regardless of whether the wireless network is a home network or a visited network. As one skilled in the art will appreciate, example CDN 116 may comprise an overlay network architected for high-performance streaming of a variety of digital assets or program assets as well as services (hereinafter referred to as "content") to subscribers, including wireless/mobile equipment users, using one or more Internet-based infrastructures, private/dedicated infrastructures or a combination thereof. In general, the terms "content", "content file", or "media segment" and the like as used in reference to at least some embodiments of the present patent disclosure may include digital assets and program assets such as any type of audio/video content or program segment, live or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. By way of illustration, content delivered via the serving wireless network (e.g., carrier network 102) may be encoded using suitable ABR streaming techniques to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on.

In general, the overlay architecture of CDN 116 may include a multi-level, hierarchically-organized interconnected assembly of network servers for providing media pathways or "pipes" from one or more central distribution nodes to one or more levels of regional distribution nodes that are connected to one or more local edge servers and/or radio network entities configured to serve a plurality of end users or subscribers in respective serving location areas. In addition to such "distribution servers", CDN 116 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of a streaming network back office infrastructure (not specifically shown in FIG. 1).

FIG. 2 depicts a flowchart of an example methodology 200 for building a database of video/ABR outage areas (i.e., radio white spot areas) according to an embodiment for purposes of the present patent application. As shown at block 202 in FIG. 2, a network entity (e.g., in the carrier network 102 or a subscriber policy management node associated with CDN 116 of FIG. 1) may initially determine a minimum threshold bitrate (e.g., for enforcing a QoS policy) authorized under an adaptive streaming technique used by a mobile device (e.g., wireless UE device 108-1) to play an audio/visual content file or program. The network entity may then monitor whether a current audio/visual segment is being delivered to the wireless UE device at a delivery bitrate that is lower than the threshold bitrate (block 204). When the delivery bitrate of the current streaming segment is determined to be lower than the threshold bitrate, the network entity may obtain the geographic location coordinates for the wireless UE device (block 206) because such reduced delivery bitrate may indicate a less than acceptable service, possibly due to various radio signal quality conditions, including a radio outage condition. Thereafter, the network entity may report those geographical location coordinates for storage into a database (block 208), which may be configured to maintain a dataset of geo-locations (e.g., in the form of location coordinates) with respect to the geographical area of the network 102 that have a less-than-desired radio coverage. Those skilled in the art will recognize that the dataset of video outage areas is not static and may not necessarily mean that there is a complete radio outage at the reported locations. Depending on variable signal parameters, improvements to the infrastructure, changes in the environmental and structural elements (e.g., buildings, towers, etc.) within the wireless network environment, and the like, a location database of potential white spot areas may be continually and/or dynamically updated as needed (i.e., by way of a learning process). Furthermore, white spot area databases and/or server systems hosting such databases may be provided with suitable application program interfaces or APIs that facilitate interaction with other network entities and services, e.g., including bandwidth control.

Those skilled in the art will recognize that if the network entity (e.g., network controller 106 in FIG. 1) serving a mobile device determines that the mobile device is heading toward an outage area (e.g., while roaming in a vehicle) where data coverage is poor or less-than-desired, the network entity may calculate how long it would take for that vehicle to reach closest to the video outage area based on the vehicle's current speed and direction of travel. Such a calculation may yield, among others, parameters such as "Time_to_video_outage_location" or "Time_to_location", which may be used to further calculate how long the network entity should wait before forcing (e.g., by limiting the bandwidth of the delivered data) or instructing (e.g., via a message) the mobile device to switch to a lower bitrate within the manifest file associated with a streaming session. For example, a UE-specific message may be sent from the network entity informing the UE to switch to the lowest bitrate in the currently-played video segment's manifest file while traversing the white spot area.

In one embodiment, by preemptively forcing a bitrate change, the network entity may enable the mobile device's client player to fill available empty portions of its playback buffer with lower quality video segments, resulting in a larger number of segments pre-downloaded. With more segments in its playback buffer, the client can continue the video playback for a much longer time than with fewer segments at a higher bitrate stream. Thus, by forcing the client to the lowest bitrate and enabling it to fill its internal buffer with lower quality video segments to maximize the video playout length, the network entity may enable the mobile client to navigate through the outage area (assuming that the vehicle carrying the mobile device reasonably maintains the same speed of travel/heading) without video data disruptions. In one variation, such "advance" filling of client's playback buffer (with lower quality video segments) just prior to the client device's entry into an outage area may be sufficient to enable the client device to cross that area without running out of video segments during transit. In another variation, the network entity may perform a different type of calculation to determine the "proper" or "most suitable" bitrate based on a calculated length of time to navigate the outage area. This calculation may prevent the mobile client from going to the absolute worst video quality (e.g., at the lowest bitrate resolution in the manifest) if the calculated time to navigate through the outage area based on various segment bitrates can settle on a higher quality of video (at a higher bitrate) and still fill the client's playback buffer with enough playout time to make it through the outage area without video interruptions.

By way of an example implementation, a parameter called "Time_to_lower_bitrate" may be calculated based on the "Time_to_location" parameter mentioned above as well as available lowest segment delivery bitrate values so that enough video segments may be delivered to the mobile UE client while is still under acceptable data coverage (from the serving base station infrastructure) prior to entering the video outage area. The network entity may ascertain whether the client device's actual physical location (e.g., as reported by the device itself or as determined using one or more known or heretofore unknown location/positioning methods) has reached a "Calculated Location" (i.e., the location the UE-carrying vehicle may reach, assuming no significant change in the direction or speed of travel, where the bitrate is to be lowered) to force the lower delivery bitrate. If there is a change in one or more variables (e.g., a significant change in travel direction or speed), the network entity may return to its monitoring of the streaming delivery session as well as the mobile client's parameters to recalculate appropriate parameters to determine adjusted times where the lowered delivery rates should start. Accordingly, by selecting the lowest authorized bitrates in the manifest, and thereby enabling the mobile client to fill its video playback buffer with sufficient number of video segments (albeit of lower quality), sufficient video buffer priming may be provided to last through a video outage area.

Referring to FIG. 3, an exemplary pictorial representation 300 shows how a video buffer may be "primed" or "pre-filled" prior to entering an outage area 318 using a variable bitrate scheme such that a UE-carrying vehicle 308 may be provided with video content for playout while transiting through the video outage region 318. Initially, the UE may be downloading ABR video segments encoded at the bitrate resolution of 2 megabits per second (Mbs or Mbps). If the UE's ABR client has a playback buffer 302 of size 32 MB, that buffer may be able to accommodate twelve (12) such 2 Mbs segments (assuming that each segment contains 10 seconds of video). As a result, the UE would have 2 minutes (12 segments×10 seconds/segment) of High Quality (HQ) playback time as exemplified by the buffer configuration 302, which the UE's player would continue to play from its buffer. When the UE/vehicle 308 starts approaching the outage area 318 as indicated by the example travel direction 306, the network entity may determine—based on UE/vehicle's speed and direction of travel—that the UE/vehicle 308 would "hit" the outage region 318 at a point 316 in the next 7.1 minutes, as exemplified by the illustrative calculation block 320. As shown, the estimated direction/heading of the vehicle is such that the radio signal quality becomes progressively less desirable, as exemplified by signal strength bars 310, 312 and 314, before the outage area 318 is encountered. In one implementation, whenever a UE/vehicle is within certain time interval (e.g., 7 to 8 minutes of travel time or its corresponding distance based the vehicle's velocity) from the outage region 318, the network entity may force the UE to switch to a lower bitrate for playback of video content (e.g., the lowest bitrate in the video content's manifest file). Hence, in the illustrative representation 300 of FIG. 3, when the network entity determines that the UE/vehicle 308 is heading toward the outage region 318 and would 'hit" that region in the next 7.1 minutes, the network entity may reduce its segment delivery bitrate to 600 Kbps as indicated at the example calculation block 320. As a result, the UE's ABR player would be forced to select the lowest bitrate in the manifest (e.g., 500 Kbps) to download video segments from the network's content delivery server. Instead of the previous HQ segments at 2 Mbps, the client player would be now forced to start maintaining its playback buffer with Low Quality (LQ) video segments downloaded at the lowest manifest bitrate of 500 Kbps, as illustrated by the buffer configuration 304. This process may continue as shown by the buffer configurations 322 and 324 and conclude when the entire playback buffer is filled with such LQ video segments.

When the UE/vehicle is physically closest to the outage region—as indicated by reference numeral 316—the client's playback buffer would be filled with enough 500 Kbps segments to allow the UE/vehicle "traverse" the outage area 318 without playback interruption. In the embodiment of FIG. 3, it is shown that the client's 32 MB playback buffer is now filled with a plurality of LQ (500 Kbps) video segments, each segment containing 10 seconds of video, which would allow the client to have about 8.5 minutes (e.g., 51 segments×10 seconds/segment) of LQ play. If the UE-carrying vehicle 308 is traveling at 60 MPH, this would allow uninterrupted video playback for the next 8.5 miles of travel distance, which may be sufficient for the outage region 318 in the vehicle's direction of travel.

Although such bitrate-throttling techniques may provide adequate pre-buffering for ABR clients having fixed size buffers, they may not be entirely satisfactory for devices whose hardware definitions include fixed number of segments allocated to their ABR clients. For example, in such devices that buffer a fixed number of segments, decreasing the bitrate may force the client to begin downloading lower bitrate segments but the number of segments will never exceed that fixed number segments configured for the client. Thus, if the client's maximum buffer size is N segments and the downloaded segments are T seconds each, the amount of play out will not exceed N times T seconds, which may not necessarily be appropriate when areas with variable lengths of outage may be encountered, e.g., depending on vehicle speed, traffic conditions, etc.

Accordingly, because encoded content segments may be defined for the client player across multiple bitrates in ABR streaming, a key consideration in one or more embodiments set forth hereinbelow is to prime the mobile client based on optimizing segment sizes for available bitrate(s) at a location before entering an outage area. In one implementation, priming the client may commence similar to the techniques set forth above, mutatis mutandis, after it has been determined that the system cannot achieve the highest bitrate of the manifest but at a suitable/acceptable bitrate that has been determined to be possible at a particular location for a given number of segments. Further, in some embodiments, dynamically increasing or decreasing segment sizes during video delivery may be coupled with throttling bandwidth in order to optimize the ABR video for optimize play out time through the outage area.

Broadly, various embodiments are provided to optimize bandwidth and media segment lengths for clients that buffer a fixed number of segments. To achieve one or more objectives of the present disclosure, a client's number of buffered segments may first be determined. For example, on initial startup of a video session with the client, the bandwidth and number of segment pulls are recorded or otherwise monitored and the delivery of the media segment patterns is observed. When a client is initially filling its buffer, the segment pulls are continuously effectuated until the buffer is full. After the buffer is full, the client only pulls a segment to maintain a full buffer state once a media segment has completed play out. Through this delivery pattern, both the segment buffer size and the segment length may be automatically calculated in some example implementations.

When a mobile video client has been determined to be traveling into a video outage area, the time to enter the area is calculated similar to the techniques set forth hereinabove. Based on direction and rate of travel, the time to traverse the outage may also be estimated. Responsive to these calculations and estimations, the segment sizes may be dynamically adjusted along with the delivery rate to optimize the ABR client's buffer to maintain video play out during travel throughout the video outage area. Once it has been determined the client has exited the video outage area, the original segment sizes may be restored to their original state and the bandwidth throttle may be removed. This allows the ABR client to rapidly adjust its video quality based on the increases in bandwidth as a result of continuing to travel into areas of better signal quality. Additional details regarding these embodiments are set forth below.

Figure 4:
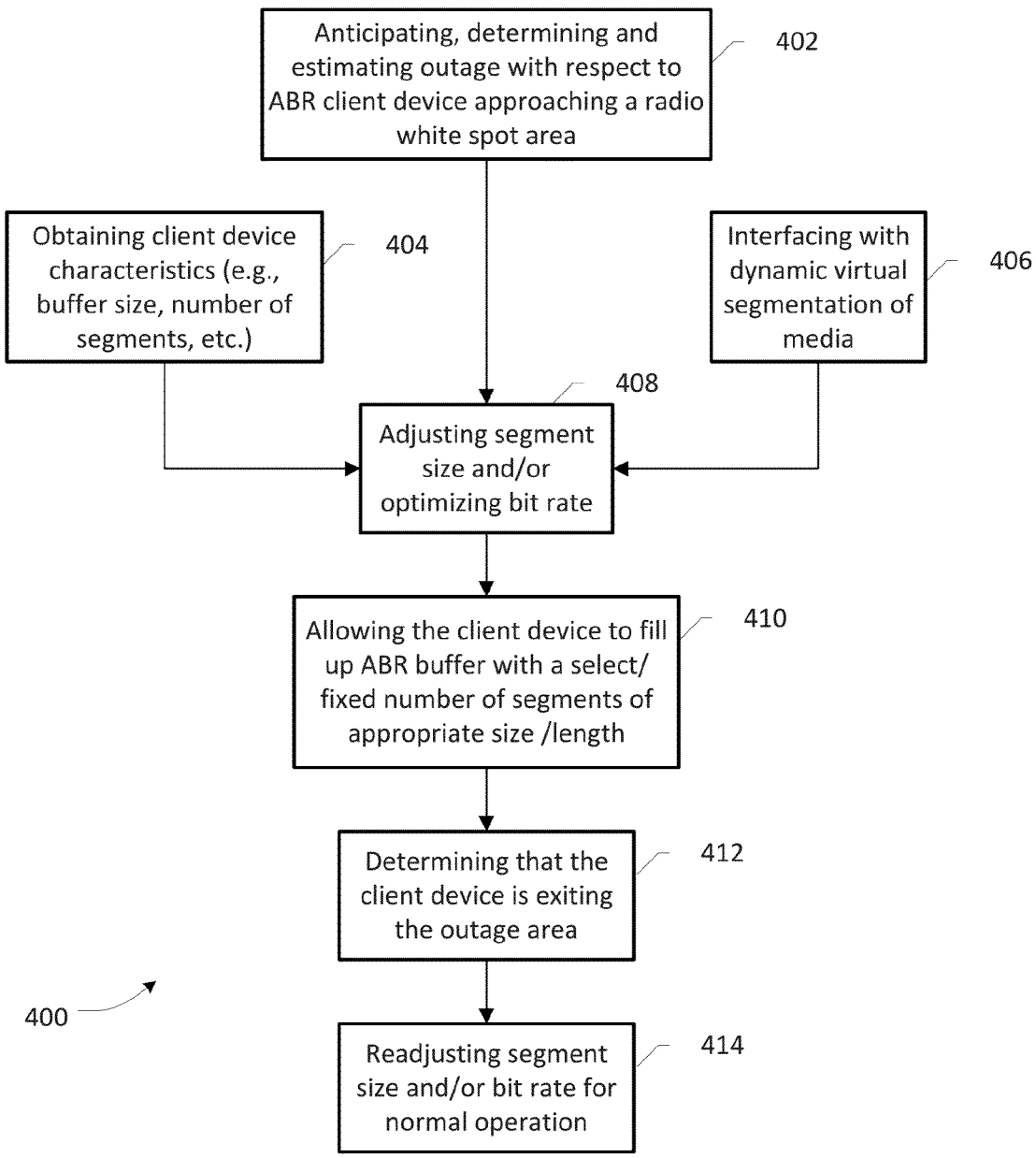
FIG. 4 depicts a flowchart of various blocks, steps and/or acts that may be combined in one or more arrangements that illustrate one or more embodiments of the present patent disclosure for optimizing segment sizes while traversing a white spot area of a wireless network environment.

FIG. 4 depicts a flowchart 400 of various blocks, steps and/or acts that may be combined in one or more arrangements that illustrate one or more embodiments of the present patent disclosure for optimizing segment sizes while traversing a white spot area of a wireless network environment. In one arrangement, at least a portion of the blocks may be executed at a network node or system such as an ABR stream delivery server. At block 402, various functionalities with respect to anticipating, determining and estimating video outage may take place with respect to an ABR client device approaching the white spot area in the network environment, which in one embodiment may involve executing suitable triangulation techniques as well as querying suitable outage area databases, and the like, as described above. For example, a determination may be made that the wireless UE device including the ABR client and currently engaged in an ABR streaming session is heading towards and/or entering a radio white spot area based on a variety of techniques for positioning/locating and estimating a travel direction of a mobile device known in the art. Such techniques may comprise positioning methods based on radio cell coverage, Global Positioning System (GPS), Assisted GPS (A-GPS), Global Navigation Satellite System (GLONASS), Galileo, or other satellite based systems/methods, or Time-Of-Arrival (TOA), Uplink Time Difference Of Arrival (UTDOA), Observed Time Difference Of Arrival (OTDOA), or Enhanced Observed Time Difference (E-OTD) methods. In general, additional description of the positioning methods in a cellular network may be found in such 3GPP Technical Specifications (TS) as, for example, the TS 36.305 (E-UTRAN; Stage 2 functional specification of UE positioning in E-UTRAN), the TS 25.305 (Stage 2 functional specification of UE positioning in UTRAN), and TS 43.059 (Functional stage 2 description of Location Services (LCS) in GERAN). Many of these positioning methods may be based on network triangulation, Wi-Fi positioning, and/or wireless UE device's internal sources such as accelerometers, position sensors, etc., in addition to utilizing speed/direction estimations of a vehicle in which the wireless UE device may be operating. Accordingly, given a set of current location coordinates of the wireless UE device (and/or the vehicle) as well as a speed/direction estimate associated therewith, it can be anticipated as to where and when the vehicle and its UE device (hereinafter, the terms "vehicle" and "wireless UE device" operating therein will be used somewhat interchangeably for purposes of the example embodiments unless otherwise expressly noted) will encounter radio white spots over a projected route and/or duration of time by querying a suitable video outage database.

In another arrangement, process flow 400 may further involve obtaining client device characteristics such as, for example, buffer size, number of segments (if previously unknown), and the like, as set forth at block 404. In one example implementation, the network node, e.g., ABR stream delivery server, may engage in a plurality of traffic/delivery monitoring techniques with respect to the ABR client device being served to determine or otherwise obtain the client's buffer size and/or number of segments. The process flow 400 may also involve interfacing with a segmenter that is operative to provide virtualized segmentation of encoded media content streams received thereat (block 406). Based on the functionalities, determinations and/or suitable inputs from blocks 402-406, the network node or system including an ABR stream delivery server is operative to adjust the segment size(s) and/or bitrates for suitably pre-filling the client buffer (block 408). A delivery manager module that may be integrated or otherwise associated with the ABR stream delivery server may thereafter effectuate streaming of the suitably sized segments to allow the client device to fill up its buffer, i.e., with a fixed number of segments (block 410), by providing suitably constructed manifest files for the (re)adjusted/(re)sized media segments. Upon determining or otherwise obtaining a notification that the client device is exiting the outage area (block 412), the segment sizes and/or bitrates may be (re)sized/(re)adjusted for normal operation, which may include, for example, restoring the segment sizes and/or bitrates to the sizes/rates used prior to entering the outage area (block 414).

Figure 5:
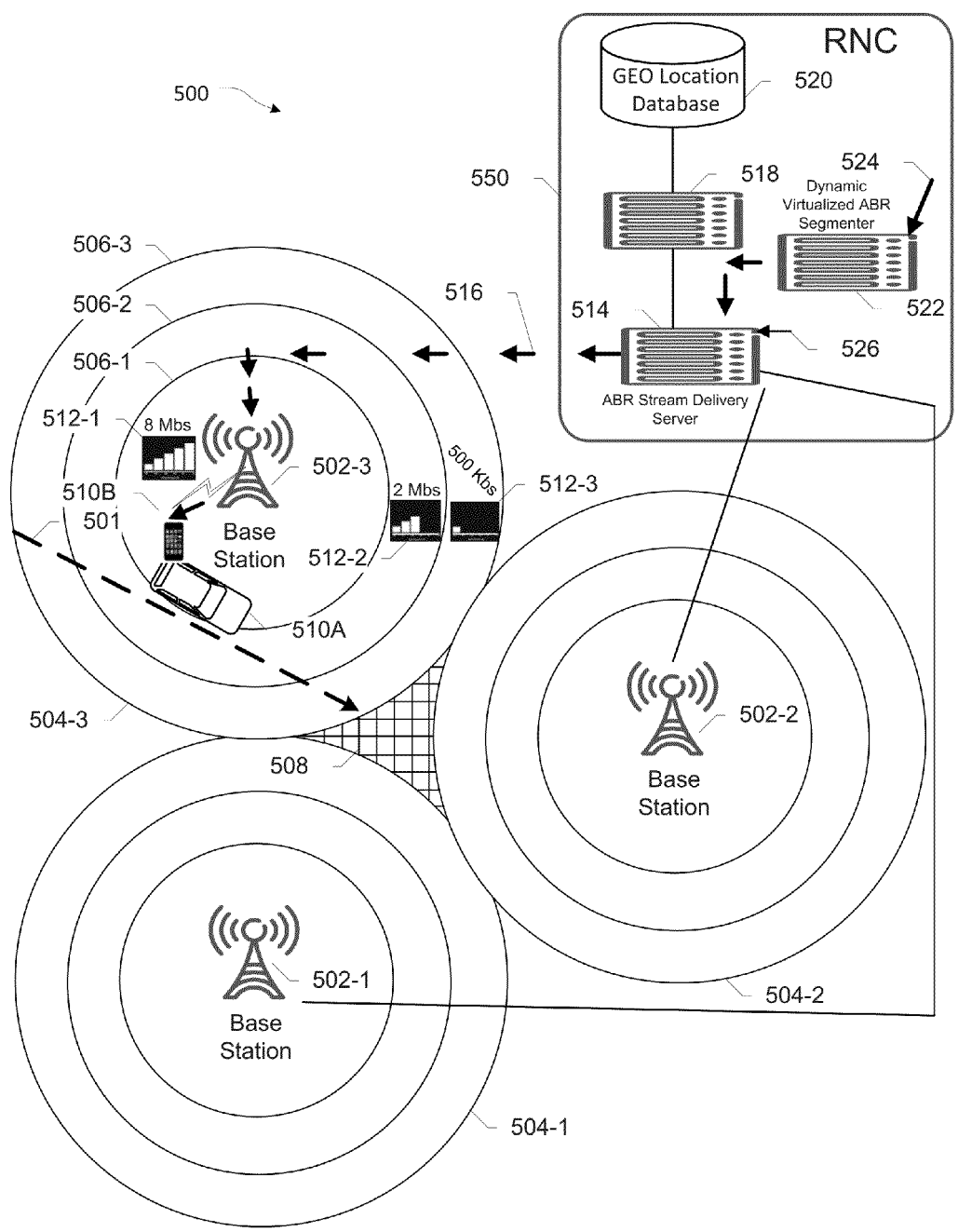
FIG. 5 depicts an example wireless network environment with additional detail including a network subsystem for optimizing segment sizes and/or bitrate resolutions according to one or more embodiments of the present patent disclosure.

Turning to FIG. 5, depicted therein is an example wireless network environment 500 including a network system or subsystem 550 with additional detail for optimizing segment sizes and/or bitrate resolutions according to one or more embodiments of the present patent disclosure. By way of illustration, the example wireless environment 500 is shown as comprising a plurality of coverage areas, e.g., areas 504-1 to 504-3, effectuated by appropriate wireless network infrastructure elements, e.g., base stations 502-1 to 502-3, corresponding thereto. As is known in the art, a radio coverage area by a base station may take any shape and include varying levels of signal quality and strength, wherein there may be some coverage gap depending on a number of factors. Illustratively, coverage areas 504-1 to 504-3 are exemplified as circular regions, each having a plurality of concentric signal quality/strength contours. By way of example, coverage area 504-3 is shown to include three such contours 506-1 to 506-3, each depicted with a respective signal level indicator icon, 512-1 to 512-3, respectively. Contour 506-1 having the highest signal quality is closest to base station 502-3, whereas contours 506-2 and 506-3 are spaced further away from the base station, with progressively deteriorating signal quality (i.e., strength, level, etc.). A radio white spot area or video outage area 508, which may take any shape, is illustratively shown as being disposed where the three coverage areas 504-1 to 504-3 come together. An ABR UE/client device 510B associated with vehicle 510A is illustratively shown as traversing from coverage area 504-3 to coverage 504-2, potentially via a path or route 501 that may traverse the video outage area 508.

To facilitate ABR streaming of segments with optimized size(s) and/or bitrate(s), a number of network nodes or elements may be configured to interface with or otherwise be included as part of network (sub)system 550, which in one implementation may be deployed as an RNC in the wireless network environment 500. A mobile-optimized ABR stream delivery server 514 is configured to deliver ABR content to wireless UE devices via respective sessions established through the serving base stations of the wireless network environment, wherein content streams 524 may initially be received at a dynamic virtualized ABR segmenter 522 for virtualization, as will be set forth in additional detail below. It should be understood that content streams 524, which may be encoded at different bitrates and provided with appropriate timing information, e.g., presentation and decoding timestamps (i.e., PTSs/DTSs) and stream access points (SAPs), may originate from any number of content sources involving appropriate CDN infrastructure elements (not shown in FIG. 5) and may be received by the segmenter 522 via appropriate interfaces. The ABR stream delivery server 514 may be provided with an interface to the segmenter 522 for effectuating control communications therewith, in addition to receiving segmented content streams. Also, appropriate radio interfaces may be provided with the ABR stream deliver server 514 with respect to the serving base stations, which may be configured to maintain/monitor UE devices' real-time mobile sessions 526. The ABR stream delivery server 514 may also interface with a video quality location awareness server 518 and associated geo-location database 520 having relevant video outage area information. In one implementation, such a database may be developed using a learning process described above with respect to FIG. 2. A delivery bandwidth manager module (not specifically shown in FIG. 5) associated with the ABR stream delivery server 514 may monitor delivery bitrate/bandwidth for the streaming content delivered to the client devices as well as effectuate monitoring of segment delivery patterns. In one embodiment, such delivery bandwidth manager module may be integrated as part of the ABR stream delivery server 514, which may be configured to provide updated manifest files for the resized segments to be delivered to the UEs pursuant to respective ABR streaming sessions.

In a streaming session startup phase, the ABR stream delivery server 514 (and/or associated delivery module) is operative to effectuate delivery of content to the ABR UE client 510B with certain initial segment sizes and no bitrate throttling via the serving base station 502-3 as the initial signal strengths may allow, e.g., as shown via path 516 for pulling 8 Mbs video segments of 10 seconds each. As the streaming session is underway, ABR client's characteristics of buffering segments may also be monitored by the network subsystem. During the initial startup phase, the client may pull segments using all the bandwidth allowed by the bandwidth delivery control mechanism. Thereafter, a duty cycle associated with the ABR client's playout may be monitored. For example, after the buffer is full, the ABR client may be rendered in a "sleep" mode until a video segment has completed playout, whereupon a video segment may be fetched to maintain the ABR client's full buffer state. This pattern may be learned, and if the encoded segments are T seconds each, the duty cycle sleep time will also be T seconds.

Figure 7A:
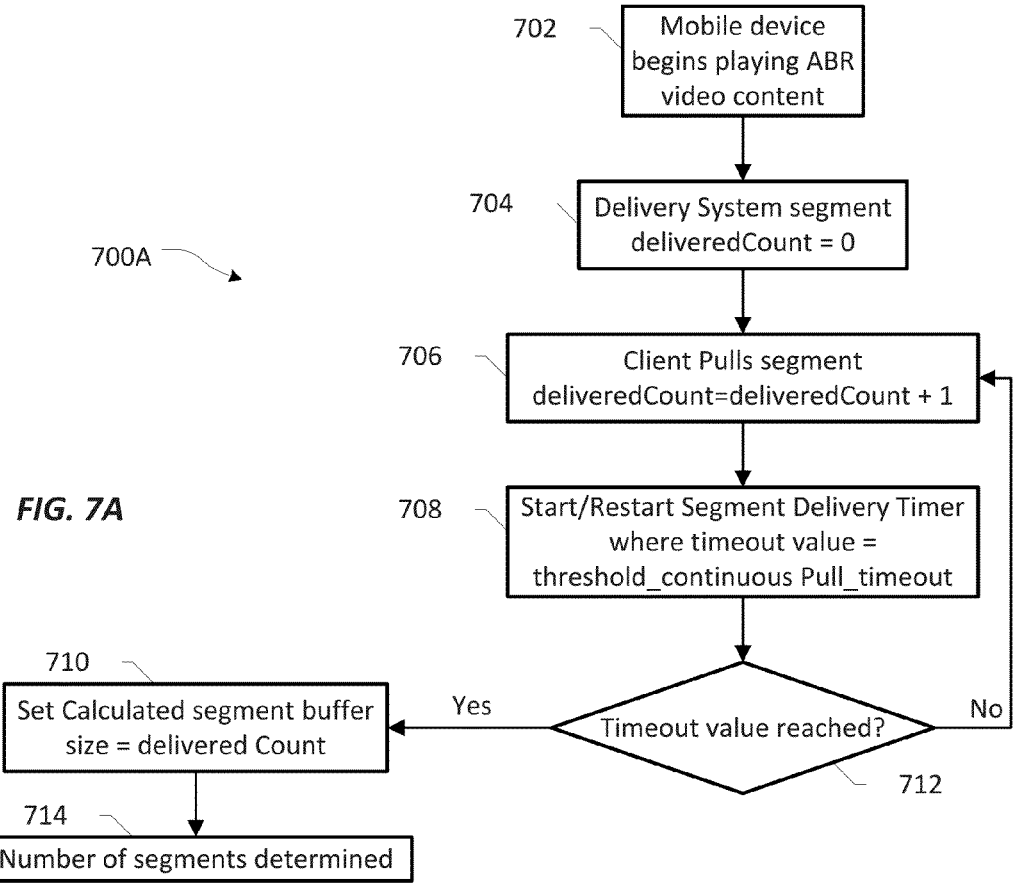
FIGS. 7A and 7B depict flowcharts of various blocks, steps and/or acts that may be combined in one or more arrangements that illustrate one or more embodiments for determining, estimating and/or otherwise learning an ABR client's characteristics.
Figure 7B:
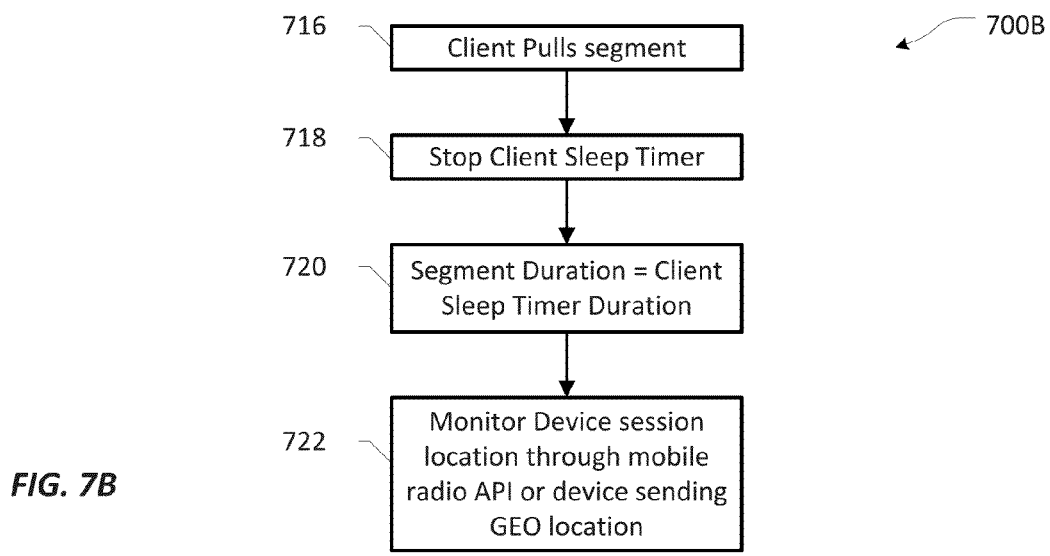

Additional details with respect to learning ABR client characteristics are illustrated in the flowcharts of FIGS. 7A and 7B that depict various blocks, steps and/or acts that may be combined in one or more arrangements, either at the device side, network side or both. Embodiment 700A of FIG. 7A illustrates an example process for determining, estimating and/or otherwise learning the number of segments that a client buffer may be provided with. At block 702, the ABR client device (e.g., a mobile device) begins playing ABR video content obtained via initial segment delivery. With a deliveredCount variable set to 0 (block 704), an iterative loop may be executed until a timeout value is reached (block 712) for keeping count of the number of segments delivered wherein the deliveredCount variable is sequentially incremented, as set forth at blocks 706 and 708. A segment delivery timer may be compared against the timeout value, which may be set at a configurable variable called threshold_continuous Pull_timeout, which would typically be less than 2 seconds. Essentially, the ABR client keeps pulling the segments and fills its buffer before entering sleep mode, and the system is configured to monitor the continuous pulling session to determine or otherwise estimate the number of segments pulled in that session. After exiting the loop, the buffer size may be set in terms of the final value of the deliveredCount variable, which is also determined as the number of segments (block 710 and 714). It should be appreciated that the foregoing steps may also be repeated a number of times in yet another outer loop so as to improve the accuracy/confidence of the estimation of the client buffer's number of segments.

Embodiment 700B of FIG. 7B illustrates an example process for monitoring the size or duration of segments. Upon initializing a client sleep timer, the client pulls a segment, as set forth at block 716. Thereafter, the sleep timer is stopped and the segment duration is determined as the sleep timer duration (block 720). Additionally or optionally, device location information may also be obtained in a number of ways as set forth at block 722.

Figure 6:
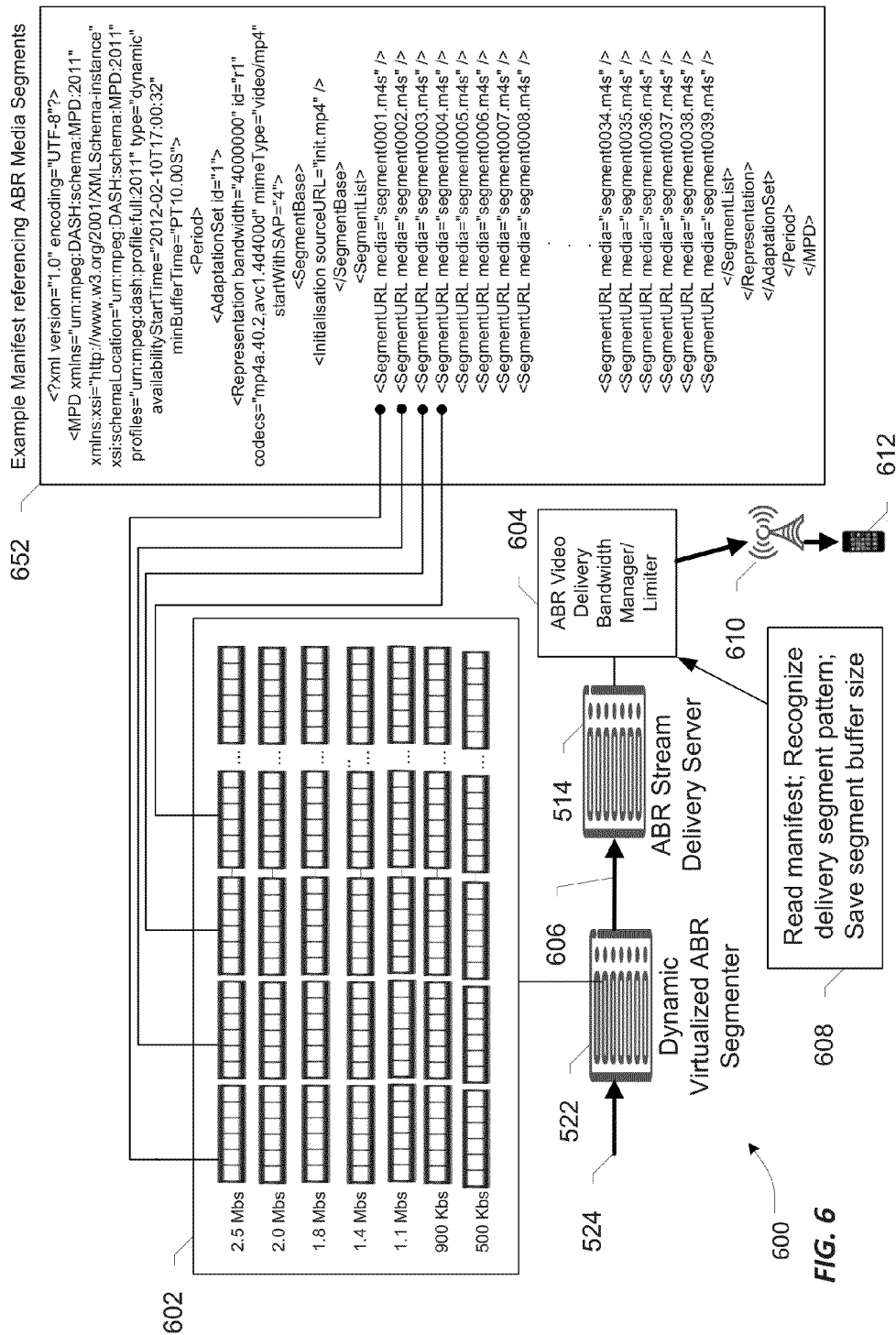
FIG. 6 depicts a block diagram of an example network subsystem for effectuating a virtualized representation of ABR media segments for purposes of the present patent disclosure.

FIG. 6 depicts a block diagram of an example network system or subsystem 600 for effectuating virtualized representation of ABR media segments for purposes of the present patent disclosure. As set forth above in reference to FIG. 5, the ABR segmenter 522 is operative to receive one or more content streams 524 encoded at different bitrates in order provide a dynamically virtualized representation of segmented content streams in a random access memory (RAM) associated therewith. Reference numeral 602 refers to an illustrative RAM portion having a plurality data structures encompassing pointers that correspond to various time codes (e.g., PTS/DTS and SAP information) as well as references to unsegmented content streams at bitrates ranging from 500 Kbs to 2.5 Mbs. A processing unit of the segmenter 522 is operative to generate a suitable manifest that includes a plurality of references corresponding to a plurality of content stream fragments, which may be provided to the ABR stream delivery server 514 for purposes of effectuating a streaming session. Reference numeral 652 is an example manifest referencing various ABR segments including 2.5 Mbs to 500 Kbs segments. The processing unit is further configured to obtain content bytes associated with a requested fragment from the data structures based on a start time and stop time associated with the requested fragment and computing corresponding pointers associated with the plurality of data structures to look up the content byte data. Additional details regarding virtualized segmentation of ABR content streams may be found in commonly owned U.S. Pat. No. 8,762,452, incorporated by reference herein. Because the time code information of unsegmented content streams is readily available, segments of different size may be constructed and appropriate manifests therefor may be provided when segment size throttling may be deemed appropriate. Accordingly, the ABR stream delivery server 514 interfaces via communication path 606 with the virtualized ABR segmenter 622 for obtaining/constructing suitable manifest files corresponding to media segments having adjusted segment sizes based on virtualized media segment information. A delivery bandwidth manager/limiter 604, integrated or otherwise associated with the ABR stream delivery server 514, is operative to read manifests, recognize or otherwise learn delivery segment patterns and save segment buffer size and other characteristics (e.g., as set forth at block 608) with respect to an ABR client device 612 being served by base station 610, as described hereinabove.

FIG. 8 depicts an example environment illustrating segment size adjustment (i.e., throttling) and associated buffer status as an ABR client-carrying vehicle 802 approaches a potential video outage area 814. Those skilled in the art will recognize that the exemplary scenario set forth herein is similar to the example environment illustrating bandwidth throttling shown in FIG. 3 and, accordingly, the techniques set forth above with respect to FIG. 3 may be similarly applied here as well, mutatis mutandis. During an ongoing ABR video session with adequate signal quality strength, the ABR client device 802 is operative to fill its buffer is with high quality (HQ) segments, e.g., 2 Mbs segments, reaching its fixed number segment capacity. Reference numeral 806 refers to such a buffer status that exemplifies 4 segments of 2 Mbs bitrate, each being 10 seconds in duration. Accordingly, the buffer contains 40 seconds of HQ content for playout. As the vehicle 802 travels toward the outage area 814, an optimal segment size may be calculated based on estimated travel direction/heading 804, time through outage area, and learned number of segments that can be cached in the client buffer. Bandwidth throttling may also be included for effectuating pre-filling the buffer with lower encoded bitrates (e.g., 500 Kbs) in order to minimize buffer memory usage. For example, if the outage area is such that for a given vehicular speed, the outage duration is T seconds, and if the fixed number of segments that can be cached in the client buffer is N, then an optimal segment size (t) may be calculated to satisfy the relationship: N×t≥T, taking into account an acceptable lower quality bitrate. A "no coverage hit" calculation similar to the computations set forth at block 320 in FIG. 3 may be performed to estimate when the outage may be encountered and responsive thereto, the ABR stream delivery server and associated delivery bandwidth manager may commence to dynamically modify (e.g., increase or decrease as needed) the segment size. Reference numeral 808 refers to a buffer status where the example ABR client's buffer now contains 3 10-second HQ segments along with a longer segment of lower quality (e.g., of 130 seconds of 500 Kbs segment), accounting for a total of 160 seconds of playout. Likewise, as the vehicle 802 continues to travel, the pre-filling of the buffer also continues, with variable size segments being filled in, as shown at reference numerals 810 and 812. By the time the ABR client-carrying vehicle 802 reaches the outage area 814, the client buffer is primed for outage, with 4 pre-filled 130-second segments for playout of 520 seconds, each segment being a low quality (e.g., 500 Kbs) segment as the bitrate is also throttled.

Figure 9:
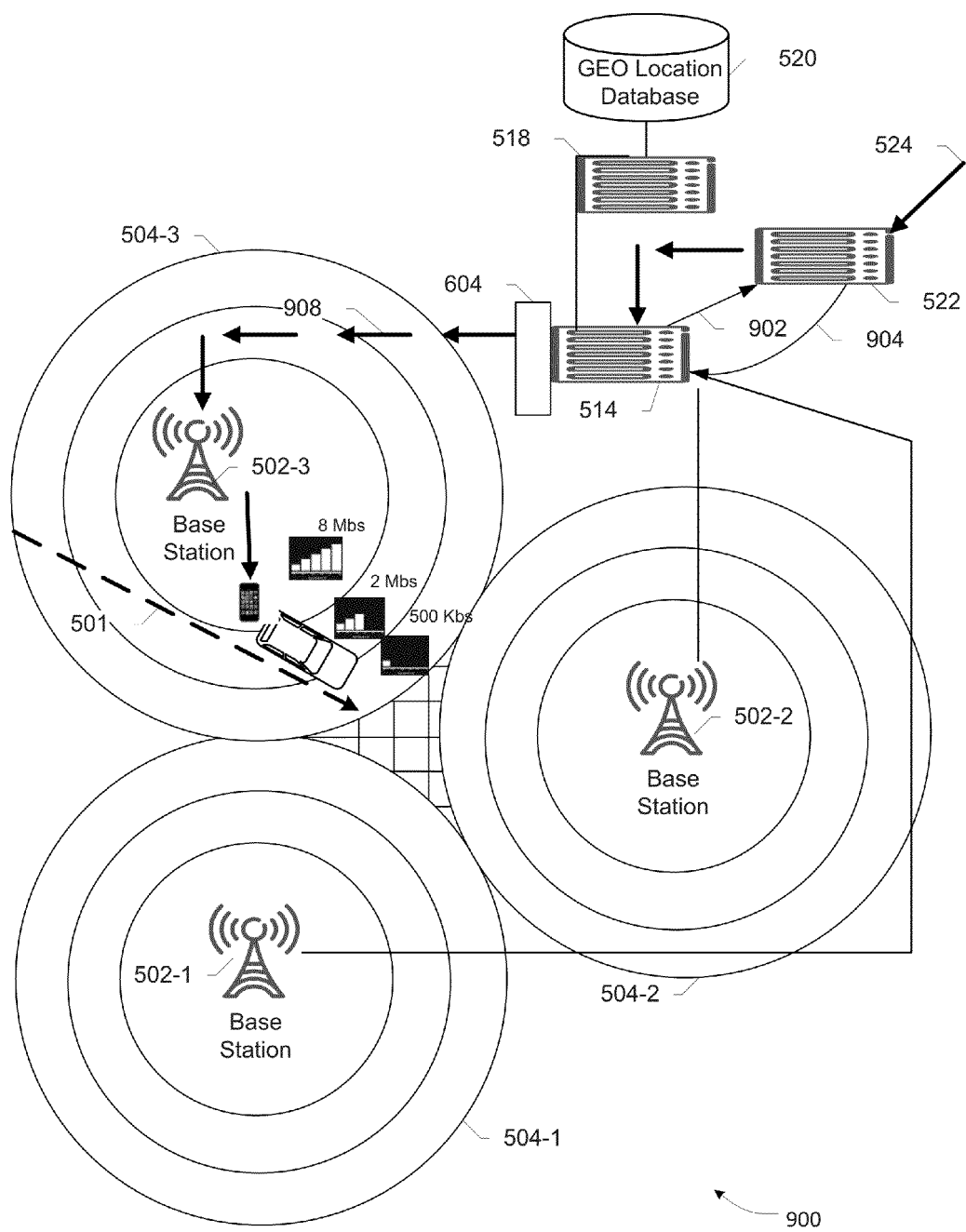
FIG. 9 depicts another rendition of example wireless network environment of FIG. 5 with additional detail relative to interactions between an ABR stream delivery server and associated segmenter of a network subsystem.

Turning to FIG. 9, depicted therein is another rendition 900 of example wireless network environment 500 of FIG. 5 with additional detail relative to interactions between the ABR stream delivery server 514 and associated dynamic virtualized segmenter 522 for purposes of segment size adjustment and/or bitrate throttling as set forth above. Reference numeral 902 refers to a request message from the ABR stream delivery server 514 to the segmenter 522 for dynamically adjusting (e.g., increasing) segment size to 130 seconds. Responsive thereto, the segmenter 522 is operative to provide information pertaining to a 130-second segment size across all ABR bitrates in a manifest to the ABR stream delivery server 514, illustrated as a response 904. Also, a virtual representation of 130-second segments and references thereto in an adjusted manifest are provided via path 906 to the ABR stream delivery server 514. Based thereon, the delivery bandwidth manager 604 associated with the server 514 is operative to force the client to only pull segments of a suitable bitrate for pre-filling. For example, with media bitrates 2.5 Mbs, 2.0 Mbs, 1.8 Mbs, 1.4 Mbs, 1.1 Mbs, 900 Kbs, and 500 Kbs represented in a manifest, throttling to 850 Kbs delivery rate forces the client to pull the encoded segments at 500 Kbs since 850 Kbs delivery is less than the 900 Kbs rate in the manifest, which optimizes the client device's buffer memory requirements for large segment storage, albeit in a fixed number of segments. Accordingly, appropriately (re)sized segments based on the adjusted manifest are delivered to the serving base station 502-3 as shown via path 908 where longer arrow portions (compared to the arrow portions of path 516 in FIG. 5) are illustrative of the segment resizing.

Figure 10A:
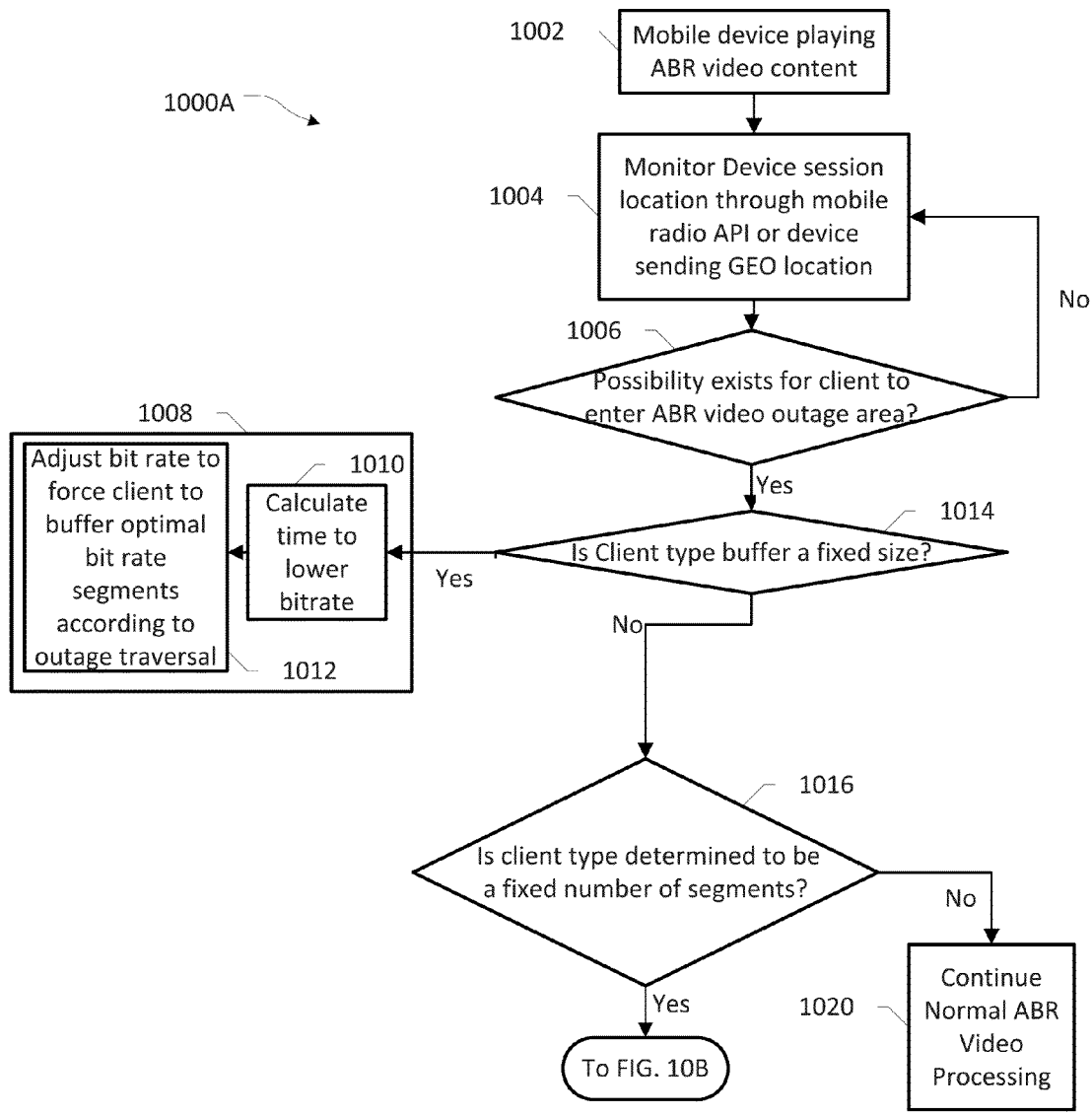
FIGS. 10A and 10B depict a flowchart of various blocks, steps and/or acts with additional detail that may be combined in one or more embodiments for adjusting segment sizes according to the present patent disclosure.
Figure 10B:
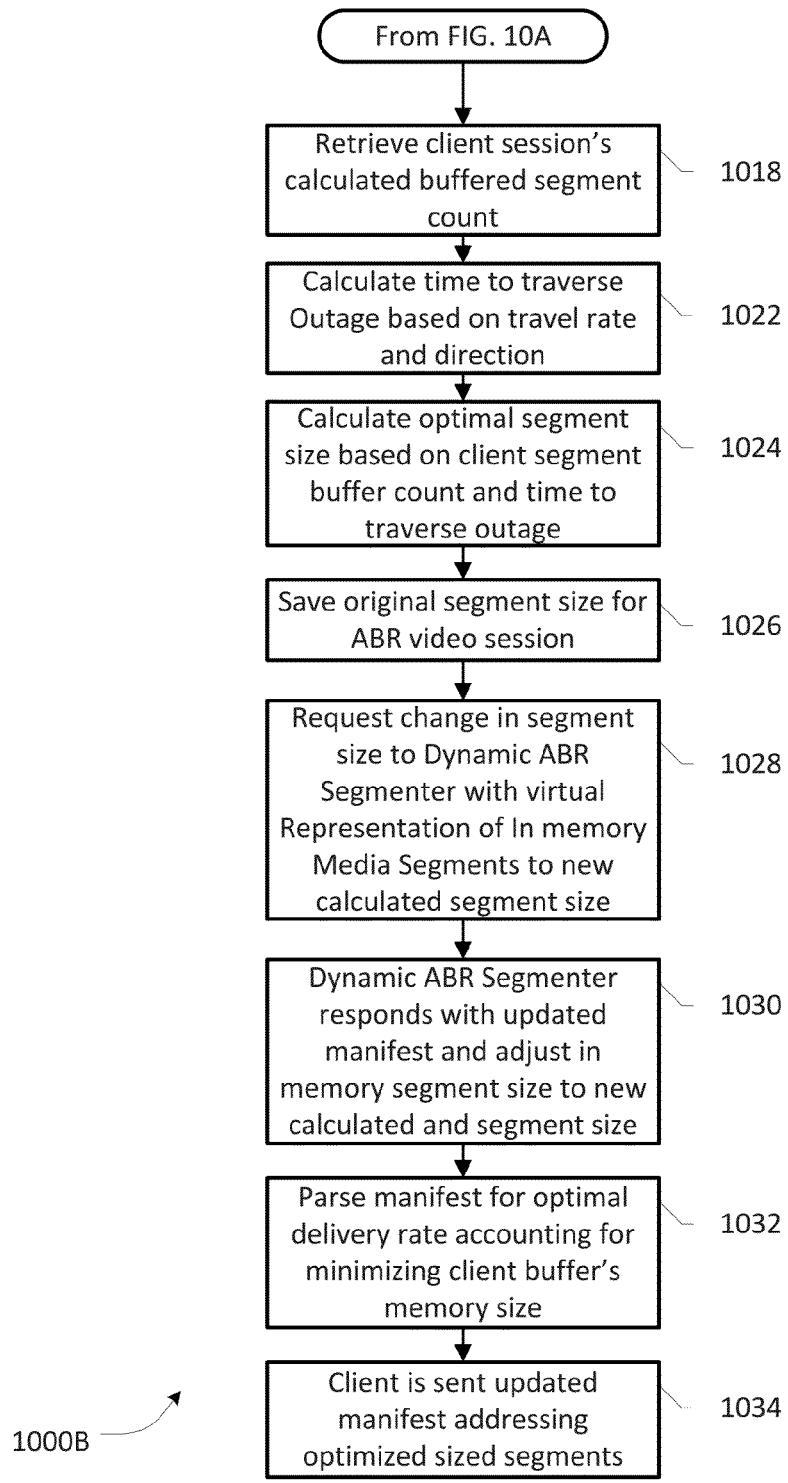

FIGS. 10A and 10B depict a flowchart of various blocks, steps and/or acts with additional detail that may be combined in one or more embodiments for adjusting segment sizes according to the present patent disclosure. At block 1002 of process flow portion 1000A, a mobile device having ABR client functionality is normally playing ABR video content. Based on monitoring device session location through mobile radio APIs or location notifications from the device, a determination is made if the mobile device is likely to encounter an outage area (blocks 1004 and 1006). A further determination may be made to ascertain if the mobile device's client buffer is of a fixed size (block 1014). If so, a bitrate throttling process 1008 may be effectuated, including calculating the time to the outage area and adjusting the bitrates accordingly (blocks 1010 and 1012), as described previously.

If the client type is determined to have a buffer with a fixed number of segments (block 1016), additional processes set forth in FIG. 10B may commence. Otherwise, usual ABR streaming operations may continue until the signal quality is deteriorated and the device is no longer capable of maintaining the streaming session (block 1020). With respect to process flow portion 1000B in FIG. 10B, the client's segment count is retrieved (block 1018), which may have been calculated or obtained according one or more embodiments described hereinabove. At block 1022, time to traverse the outage area is estimated based on parameters such as speed, direction, etc. of a vehicle carrying the mobile device. Thereafter, optimal segment size(s) may be determined based on buffer segment count and time to traverse the outage area (block 1024). Also, original segment size information for the ongoing ABR session may be stored (block 1026). A request for changing segment size may be generated to the segmenter with the virtual representation of media segments in memory in order to adjust the segment size to the new calculated size (block 1028). The ABR segmenter dynamically adjusts the segment size as requested and provides a response including an updated manifest (block 1030). The manifest is parsed to determine optimal delivery rate(s) for segments having a bitrate that minimizes the buffer memory size requirements for pre-filling (block 1032). Thereafter, the client is sent the updated manifest that includes addressing references to optimized segments with suitable sizing for facilitating media streaming (block 1034).

Figure 11A:
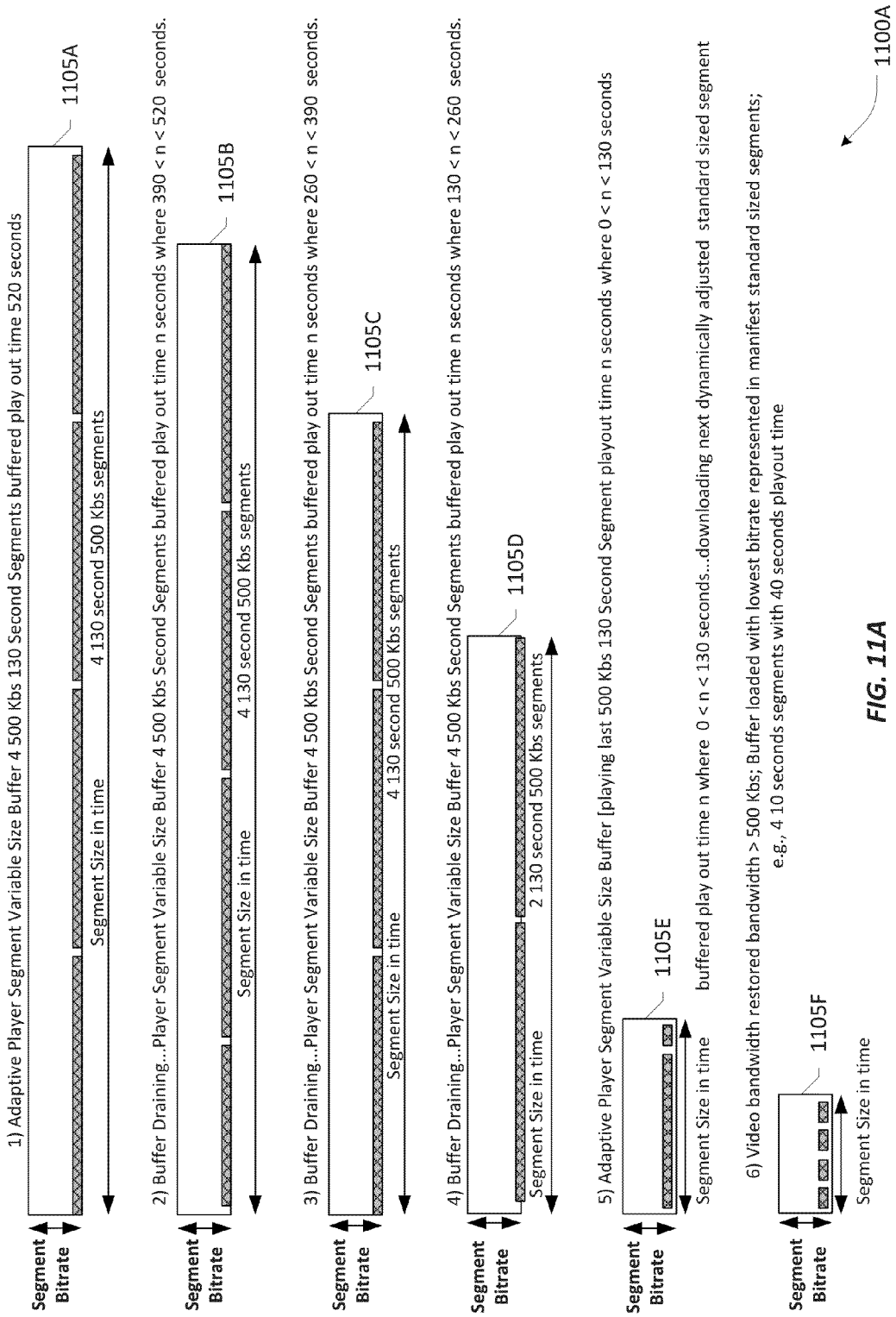
FIGS. 11A and 11B depict a playout scenario of media segments with adjusted segment sizes and segment size restoration as an ABR client device traverses through a video outage area.
Figure 11B:
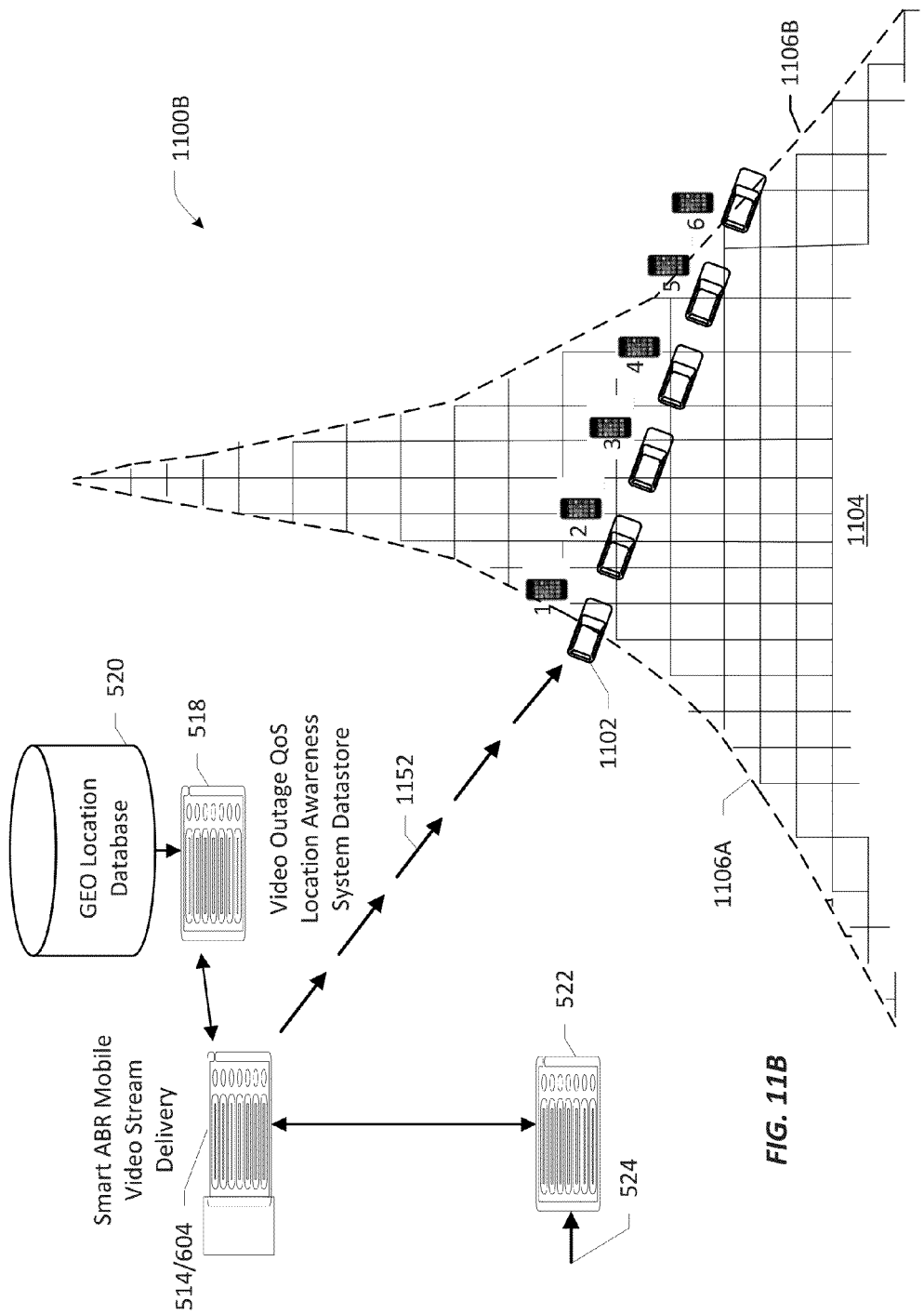

Taking FIGS. 11A and 11B together, there is depicted a playout scenario of media segments with adjusted segment sizes and segment size restoration as an ABR client device 1102 traverses a video outage area 1104 of example wireless environment 1100B. In FIG. 11A, reference numeral 1100A refers to exemplary ABR buffer status of the client device 1102 at various locations (e.g., locations 1-6) relative to the outage area 1104 having an ingress boundary 1106A and an egress boundary 1106B. A fully-primed buffer 1105A having four segments with adjusted size and bitrate (130 seconds each, at 500 Kbs) that is operative for video play out time of 520 seconds is shown relative to the device's location 1 at or near the ingress boundary 1106A. As the buffer starts to drain with each individual segment being played out, its variable status relative to locations 2-5 is shown at reference numerals 1105B-1105E. It should be appreciated that at location 5, as the device approaches the egress boundary 1106B with remaining play time of about an adjusted segment's length, the ABR stream delivery system 514/604 is operative to dynamically readjust the size (e.g., to a standard segment size previously used for streaming before the throttling began) via suitable interactions with the segmenter 522 and transmit the readjusted segments via a path 1152 established at an appropriate serving element. Accordingly, as illustrated at the buffer status representation 1105E, a 10-second segment is populated in the buffer immediately following the last 130-second segment. In one embodiment, the new readjusted segment may still comprise a low quality segment (e.g., 500 Kbs) in order to facilitate gradual ramp-up of the bitrate(s) to progressively higher quality segments represented in the manifest. As the device 1102 exits out of the outage area, i.e., location 6, the buffer is filled with four "standard-sized" segments, resulting in a 40 second playout, as illustrated at the buffer status representation 1105F.

Figure 12:
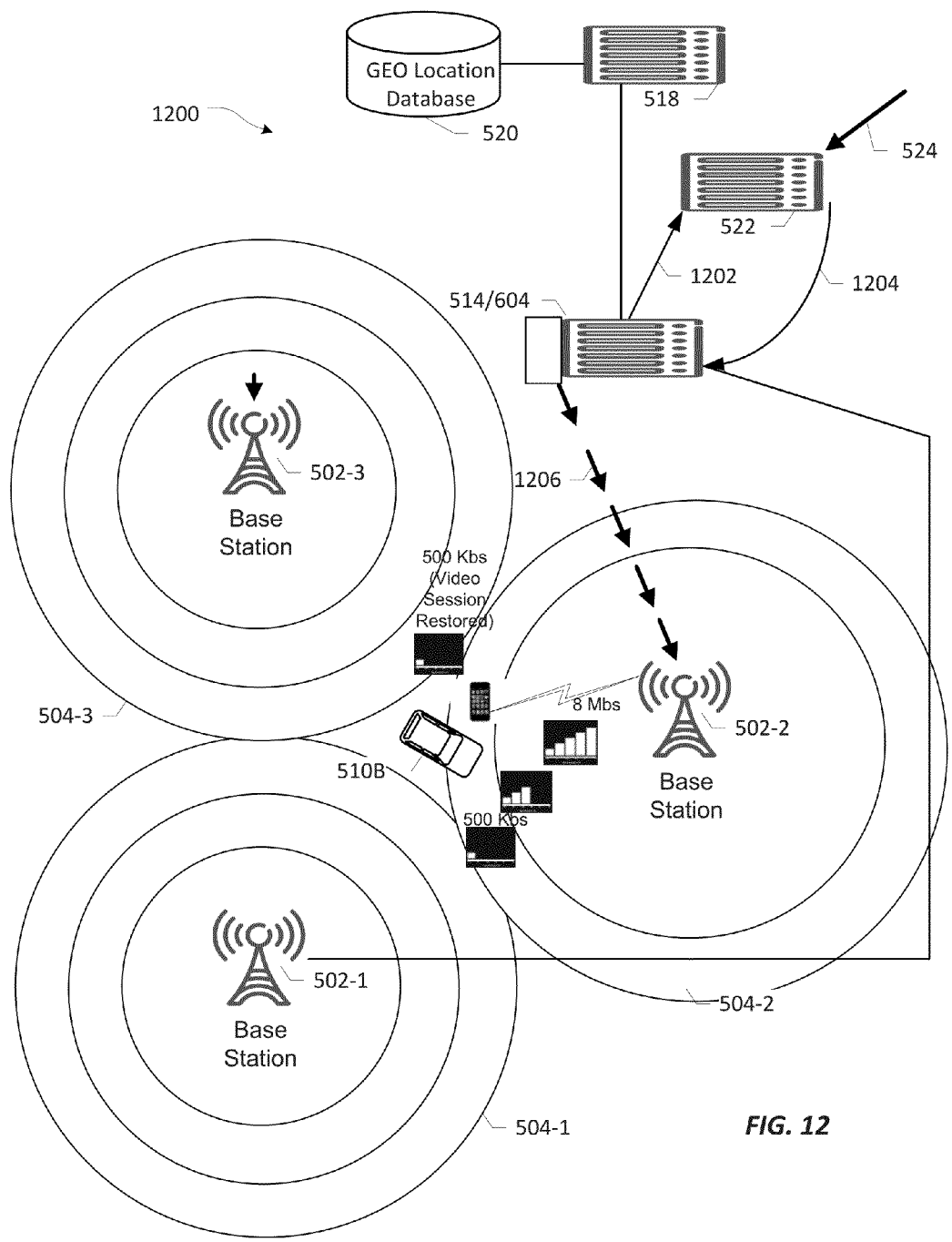
FIG. 12 depicts another rendition of example wireless network environment of FIG. 5 with additional detail relative to interactions between an ABR stream delivery server and associated segmenter of a network subsystem as the ABR client device exits a video outage area.

FIG. 12 depicts another rendition 1200 of example wireless network environment 500 of FIG. 5 with additional detail relative to interactions between the ABR stream delivery server 514 and associated dynamic virtualized segmenter 522 for purposes of segment size readjustment and restoration as set forth above. Reference numeral 1202 refers to a request message from the ABR stream delivery server to the segmenter 522 for dynamically adjusting (e.g., decreasing) segment size to a standard size that was used prior to throttling. Responsive thereto, the segmenter 522 is operative to provide information pertaining to the original segment size (in seconds) across all ABR bitrates of the manifest to the ABR stream delivery server 514, illustrated as a response 1204. Based thereon, the delivery bandwidth manager 604 associated with the server 514 is operative to remove throttled bandwidth segment delivery and allow the client device 510B to behave normally according to the available bandwidth as it enters into the serving area 504-2 of the new serving base station 502-2. With the segment size restored, the bitrate(s) may be ramped up gradually, with the streaming session 1206 now being facilitated by the new serving infrastructure, wherein shorter arrow portions (compared to the arrow portions of path 908 in FIG. 9) are illustrative of the segment resizing.

Figure 13:
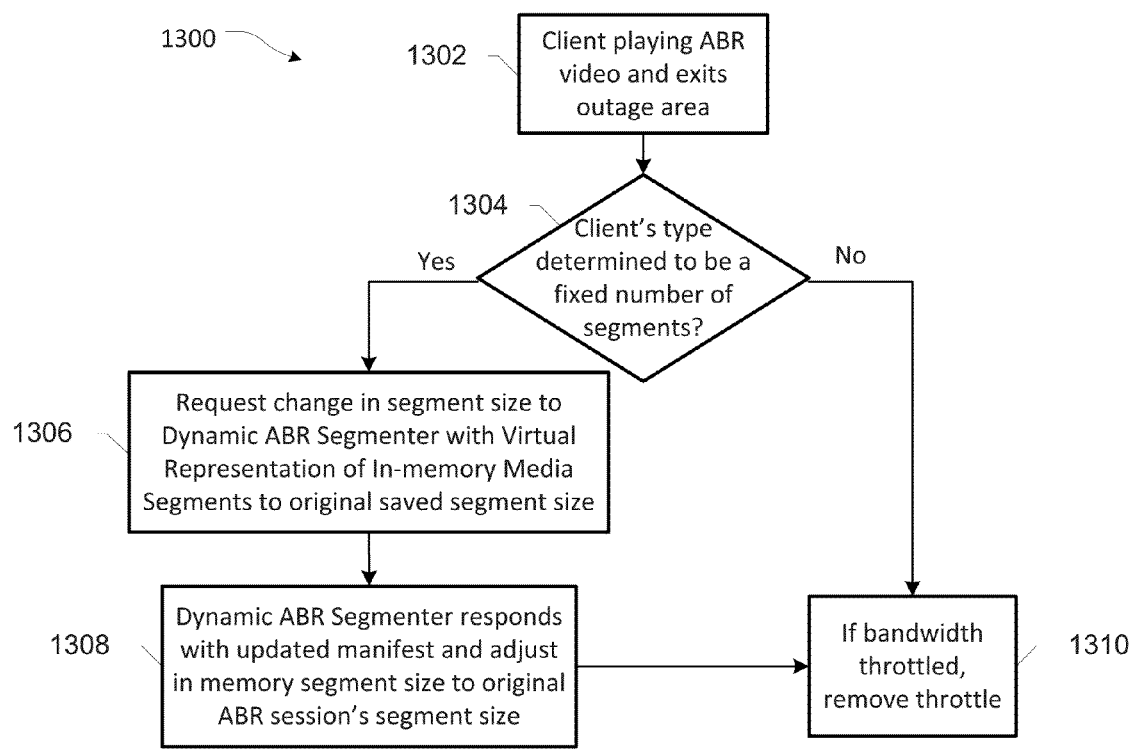
FIG. 13 depicts a flowchart of various blocks, steps and/or acts pertaining to segment size restoration and bandwidth throttling as the ABR client device exits a video outage area.

Turning to FIG. 13, depicted therein is a flowchart of various blocks, steps and/or acts pertaining to a segment size restoration and bandwidth throttling process 1300 as the ABR client device exits a video outage area. As the ABR client device playing out from its pre-filled buffer exits from the outage area (block 1302), a determination may be made whether the client type is one having a fixed number of segments (block 1304). If it is not, any bandwidth throttling that was in effect while traversing the outage area may be removed (block 1310). Otherwise, a request may be made to change the segment size as described in detail hereinabove so that the ABR stream delivery system may resume streaming of segments with the segment size previously used, based on an updated manifest having pointers to segments with the readjusted size (blocks 1306 and 1308). Additionally or optionally, if the bandwidth/bitrate was also throttled, it may be removed as well (block 1310).

Figure 14:
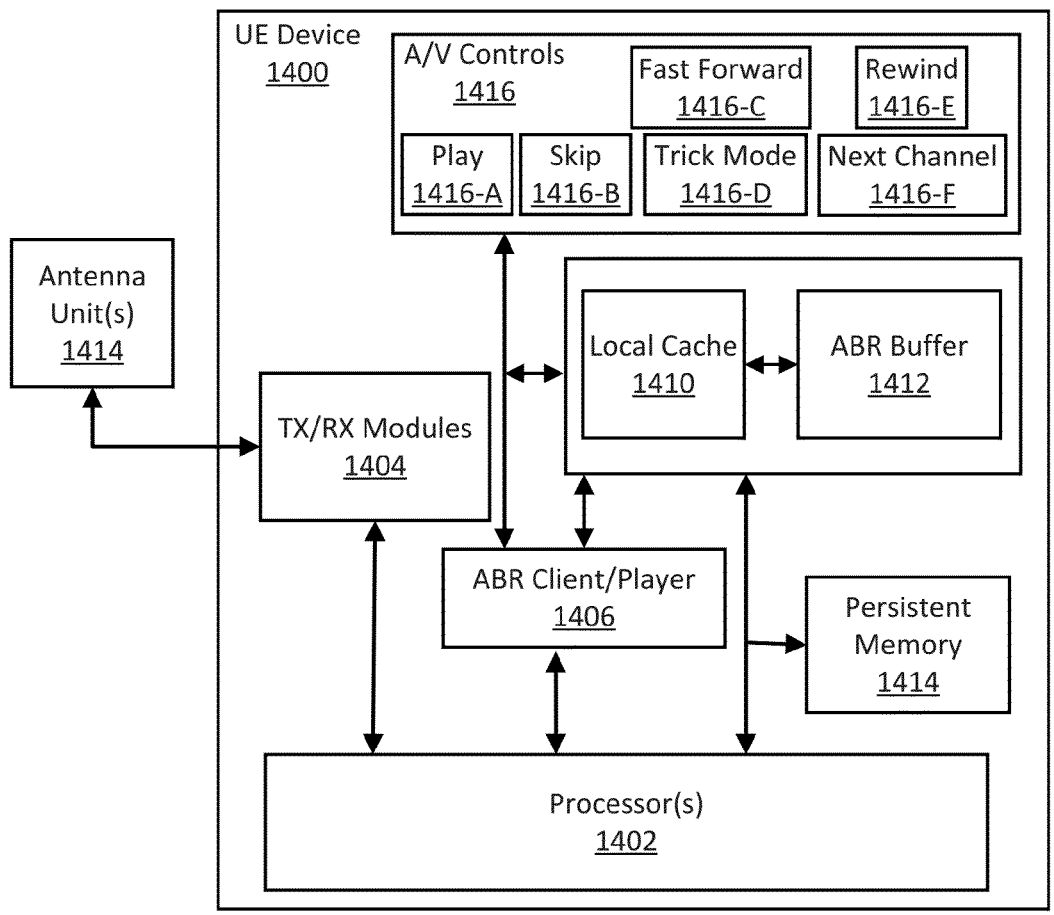
FIG. 14 depicts a block diagram of an example wireless user equipment (UE) device including an ABR client configured to execute certain aspects according to one or more embodiments of the present patent application.

FIG. 14 depicts a block diagram of an example mobile device or wireless user equipment (UE) device 1400 including an ABR client/player 1406 configured to execute certain aspects under control of processor(s) 1402 according to one or more embodiments of the present patent application. Appropriate transceiver (Tx/Rx) circuitry 1404 coupled to one or more antenna units 1414 is operative to effectuate radio communications for purposes of the present disclosure including, e.g., streaming of media, suitable notification messaging, pre-caching of dynamically-adjusted segments, etc. in addition to other standard cellular telephony/data communications. The ABR client 1406 is operative to play out segments stored in a variable size ABR buffer 1412, which may be primed with lower quality segments having an adjusted size for playback in an outage area as described above. A local cache 1410 may also be provided that is operative to store preloaded content in certain embodiments, preferably for alternative content that may be downloaded from a network entity while the mobile device 1400 is in a radio coverage area having sufficient signal quality for supporting an overall bandwidth rate that is greater than a bandwidth rate necessary for facilitating streaming of highest bitrate content possible at a particular location.

The ABR client/player 1406 may be provided with a plurality of ABR client controls 1416 that may be selectively operated by users for controlling user experience. Such ABR client controls may comprise audio controls as well as video controls available with respect to a streaming session and may include Play 1416-A, Skip 1416-B, Fast Forward 1416-C, Trick Mode or Trick Play 1416-D, Rewind 1416-E, and Next Channel or Channel Change 1416-E. A persistent memory module 1414 may be provided for storing appropriate program code or software instructions that may be executed by processors 1402 for controlling the ABR client player 1406 to receive media segments having segment sizes dynamically adjusted based on how long a service outage may last while the mobile device 1400 is traversing the area. Additional program instructions may be configured for effectuating outage message processing, display of notifications, ABR client control modulation, etc. in conjunction with other modules of the mobile device 1400.

Figure 15:
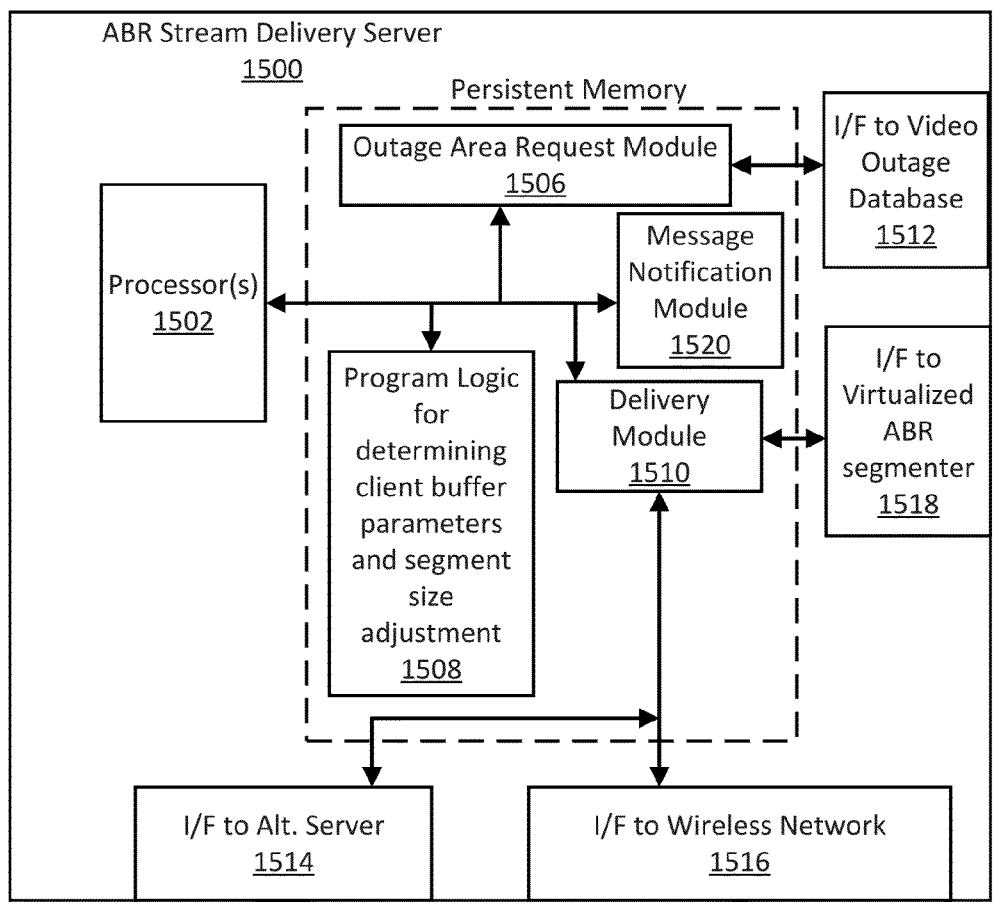
FIG. 15 depicts a block diagram of an example network element configured to execute certain aspects according to one or more embodiments of the present patent application.

FIG. 15 depicts a block diagram of an example network element 1500 configured to execute certain aspects according to one or more embodiments of the present patent application. By way of illustration, network element 1500 is exemplary of a mobile-optimized ABR stream delivery server and/or associated delivery control module as described above, which may be provided as part of an RNC in certain embodiments. One or more processors 1502 may be provided for controlling a plurality of subsystems, at least a portion of which may be implemented as a combination of hardware and software modules stored as instructions or program code in suitable persistent memory. An outage area request module 1506 is operative to effectuate suitable request/response mechanisms for obtaining video outage area information via an interface (I/F) 1512 to appropriate video QoS-aware location servers/databases described hereinabove. Additionally, suitable program instructions may be provided as one or more modules 1508 for determining client buffer characteristics/parameters and for effectuating request/response mechanisms for dynamic adjustment of segment sizes responsive to the estimated outage. Optionally, an alternative content request module may be provided that is operative to effectuate suitable request/response mechanisms for obtaining segments of alternative content based on the video outage information and/or user demographic information, etc., via an interface 1514 to one or more alternative content servers/databases. In a notification server implementation, the network element may also include a message notification module 1520 for obtaining and/or generating suitable notification messages (e.g., video-encoded messages) regarding outage area entry/exit, (re)adjustment and/or restoration of segment sizes, etc. to a mobile client in accordance with the teachings set forth hereinabove. A delivery control module 1510 is operative to effectuate segment encoding, user session segment delivery as well as appropriate bandwidth control for sessions via radio interfaces 1516 with respect to a serving wireless network. Additionally, network element 1500 may also include appropriate interfacing 1518 with respect to effectuating request/response mechanisms with a virtualized ABR segmenter as described above.

Based upon the foregoing Detailed Description, it should be appreciated that one or more embodiments of the present disclosure can be advantageously implemented in a number of wireless ABR streaming environments for optimizing segment sizes and/or bitrate throttling in potential outage areas therein.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. For example, at least some of the nodes shown in the wireless streaming network environment of FIG. 5 such as the ABR stream delivery server and/or associated delivery control module, any notification/message generation system, video outage area location server and associated database(s), dynamic virtualized ABR segmenter, for example, may be integrated or otherwise co-located in different combinations, including as part of an RNC node. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in, e.g., FIG. 2, FIG. 4, FIGS. 7A-7B, FIGS. 10A-10B, or FIG. 13, may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for modulating an adaptive bitrate (ABR) streaming client engaged in a current ABR streaming session, the method comprising:
   anticipating, at an ABR streaming server, that a wireless UE device executing the ABR streaming client is approaching a radio white spot area;
   learning, by the ABR streaming server, that the ABR streaming client has a buffer for storing a fixed number of media segments for the current ABR streaming session; and
   responsive to the anticipating and the learning, dynamically adjusting segment sizes of a plurality of media segments to be downloaded to the ABR streaming client by calculating an optimal segment size based on how long a service outage is estimated to be while the wireless UE device is in the radio white spot area, estimated travel direction of the wireless UE device and the learned number of media segments that can be cached in the ABR streaming client's buffer.

2. The method as recited in claim 1, wherein the leaning of the fixed number of media segments of the ABR streaming client's buffer is based on estimating a download duty cycle associated with the buffer.

3. The method as recited in claim 1, wherein the plurality of media segments to be downloaded for playout during the service outage comprise media segments encoded in a bitrate resolution different from a bitrate resolution of media segments being streamed before the wireless UE device enters the radio white spot area.

4. The method as recited in claim 3, wherein the bitrate resolution of the plurality of media segments is lower than the bitrate resolution of the media segments being streamed before the wireless UE device enters the radio white spot area.

5. The method as recited in claim 1, wherein the segment sizes of the plurality of media segments to be downloaded are of longer duration than segment sizes of media segments being streamed before the wireless UE device enters the radio white spot area.

6. The method as recited in claim 5, further comprising:
   determining that the wireless UE device is exiting the radio white spot area; and
   responsive to the determining, readjusting segment sizes of media segments for streaming outside the radio white spot area.

7. The method as recited in claim 6, wherein the readjusting comprises restoring the segment sizes of media segments being streamed before the wireless UE device enters the radio white spot area.

8. The method as recited in claim 6, further comprising, responsive to the determining that the wireless UE device is exiting the radio white spot area, readjusting a bitrate resolution of media segments for streaming outside the radio white spot area.

9. The method as recited in claim 1, further comprising:
   interfacing with a dynamic virtual ABR segmenter for constructing appropriate manifest files corresponding to the plurality of media segments having adjusted segment sizes based on virtualized media segment information; and
   sending the manifest files to the wireless UE device.

10. An adaptive bitrate (ABR) stream delivery server configured to modulate an ABR streaming client engaged in a current ABR streaming session, the ABR stream delivery server comprising:
   an interface to a video outage and Quality of Service (QoS) datastore having geographic location data pertaining to white spot areas where radio coverage is suboptimal for streaming content to a wireless user equipment (UE) device executing the ABR streaming client;
   an interface to a segmenter configured to receive an ABR content stream encoded at different bitrates and to provide a virtual representation of the segmented ABR content stream at different bitrates; and
   one or more processors coupled to a persistent memory module having program instructions configured to:
      anticipate that the wireless UE device is approaching a radio white spot area;
      learn that the ABR streaming client's buffer is configured to store a fixed number of media segments for the ABR streaming session; and
      responsive to the anticipating and learning, dynamically adjust segment sizes of a plurality of media segments to be downloaded to the ABR streaming client by calculating an optimal segment size based on how long a service outage is estimated to be while the wireless UE device is in the radio white spot area, estimated travel direction of the wireless UE device and the learned number of media segments that can be cached in the ABR streaming client's buffer.

11. The ABR stream delivery server as recited in claim 10, wherein the plurality of media segments to be downloaded for playout during the service outage comprise media segments encoded in a bitrate resolution different from a bitrate resolution of media segments being streamed before the wireless UE device enters the radio white spot area.

12. The ABR stream delivery server as recited in claim 11, wherein the bitrate resolution of the plurality of media segments is lower than the bitrate resolution of the media segments being streamed before the wireless UE device enters the radio white spot area.

13. The ABR stream delivery server as recited in claim 10, wherein the segment sizes of the plurality of media segments to be downloaded are of longer duration than segment sizes of media segments being streamed before the wireless UE device enters the radio white spot area.

14. The ABR stream delivery server as recited in claim 13, wherein the persistent memory module further comprises program instructions configured to readjust segment sizes of media segments for streaming outside the radio white spot area responsive to a determination that the wireless UE device is exiting the radio white spot area.

15. The ABR stream delivery server as recited in claim 14, wherein the readjusting comprises restoring the segment sizes of media segments being streamed before the wireless UE device enters radio white spot area.

16. The ABR stream delivery server as recited in claim 10, wherein the persistent memory module further comprises program instructions configured to readjust, responsive to a determination that the wireless UE device is exiting the radio white spot area, a bitrate resolution of media segments for streaming outside the radio white spot area.

17. The ABR stream delivery server as recited in claim 10, wherein the persistent memory module further comprises program instructions configured to facilitate transmission of appropriate manifest files to the wireless UE device corresponding to the plurality of media segments with adjusted segment sizes, the manifest files includes pointers to virtualized portions of the ABR content stream encoded at different bitrates.

* * * * *